US012464128B2

(12) United States Patent
Kotra et al.

(10) Patent No.: US 12,464,128 B2
(45) Date of Patent: Nov. 4, 2025

(54) VIRTUAL BOUNDARY PROCESSING FOR CCSAO, BILATERAL FILTER AND ADAPTIVE LOOP FILTER FOR VIDEO CODING

(71) Applicant: QUALCOMM Incorporated, San Diego, CA (US)

(72) Inventors: Venkata Meher Satchit Anand Kotra, Munich (DE); Nan Hu, San Diego, CA (US); Vadim Seregin, San Diego, CA (US); Marta Karczewicz, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 275 days.

(21) Appl. No.: 18/298,787

(22) Filed: Apr. 11, 2023

(65) Prior Publication Data

US 2023/0336734 A1 Oct. 19, 2023

Related U.S. Application Data

(60) Provisional application No. 63/362,932, filed on Apr. 13, 2022.

(51) Int. Cl.
*H04N 19/132* (2014.01)
*H04N 19/117* (2014.01)
(Continued)

(52) U.S. Cl.
CPC ......... *H04N 19/132* (2014.11); *H04N 19/117* (2014.11); *H04N 19/167* (2014.11);
(Continued)

(58) Field of Classification Search
CPC .. H04N 19/132; H04N 19/117; H04N 19/167; H04N 19/176; H04N 19/80; H04N 19/85
(Continued)

(56) References Cited

U.S. PATENT DOCUMENTS

2021/0152841 A1  5/2021  Hu et al.

FOREIGN PATENT DOCUMENTS

WO  2022066783 A1  3/2022

OTHER PUBLICATIONS

Bross B., et al., "Versatile Video Coding (Draft 10)", Joint Video Experts Team (JVET) of ITU-T SG 16 WP 3 and ISO/IEC JTC 1/SC 29/WG 11, 131, MPEG Meeting, 19th Meeting, by Teleconference, Jun. 22-Jul. 1, 2020, Jun. 29, 2020-Jul. 3, 2020, Online, (Motion Picture Expert Group or ISO/IEC JTC1/SC29/WG11), No. JVET-S2001-vH, Version 17, Sep. 4, 2020, XP030293002, 548 Pages.

(Continued)

*Primary Examiner* — Nguyen T Truong
(74) *Attorney, Agent, or Firm* — Shumaker & Sieffert, P.A.

(57) ABSTRACT

An example device for decoding video data includes a memory configured to store video data; and one or more processors implemented in circuitry and configured to: decode a current block of the video data to form a decoded block; determine that a current sample of the decoded block neighbors a sample along a virtual boundary in the decoded block and neighbors one or more samples that are not along any virtual boundary in the decoded block; compute band information for cross component sample adaptive offset (CCSAO) for the current sample using at least one of the one or more samples that are not along any virtual boundary in the decoded block and without using the sample along the virtual boundary; and perform CCSAO on the current sample using the band information.

24 Claims, 15 Drawing Sheets

(51) Int. Cl.
*H04N 19/167* (2014.01)
*H04N 19/176* (2014.01)
*H04N 19/80* (2014.01)
*H04N 19/85* (2014.01)

(52) U.S. Cl.
CPC ........... *H04N 19/176* (2014.11); *H04N 19/80* (2014.11); *H04N 19/85* (2014.11)

(58) Field of Classification Search
USPC .................................................. 375/240.02
See application file for complete search history.

(56) References Cited

OTHER PUBLICATIONS

Coban M., et al., "Algorithm Description of Enhanced Compression Model 3 (ECM 3)", JVET-X2025-v2, Joint Video Experts Team (JVET) of ITU-T SG 16 WP 3 and ISO/IEC JTC 1/SC 29, 23rd Meeting, by teleconference, Jul. 7-16, 2021, pp. 1-28.
"Files ECM-3.0 ECM/ECM GitLab", Retrieved on Jul. 12, 2023, pp. 1-4.
International Search Report and Written Opinion—PCT/US2023/018277—ISAEPO—Jul. 7, 2023, 14 Pages.
ITU-T H.265: "Series H: Audiovisual and Multimedia Systems Infrastructure of Audiovisual Services—Coding of Moving Video", High Efficiency Video Coding, The International Telecommunication Union, Jun. 2019, 696 Pages.
ITU-T H.266: "Series H: Audiovisual and Multimedia Systems Infrastructure of Audiovisual Services—Coding of Moving Video", Versatile Video Coding, The International Telecommunication Union, Aug. 2020, 516 pages.
Karczewicz M., et al., "Common Test Conditions and Evaluation Procedures for Enhanced Compression Tool Testing", JVET-Y2017-v1, Joint Video Experts Team (JVET) of ITU-T SG 16 WP 3 and ISO/IEC JTC 1/SC 29, 25th Meeting, by teleconference, Jan. 12-21, 2022, pp. 1-12.
Karczewicz M., et al., "Common Test Conditions and Evaluation Procedures for Enhanced Compression Tool Testing", JVET-W2017-v1, Joint Video Experts Team (JVET) of ITU-T SG 16 WP 3 and ISO/IEC JTC 1/SC 29, JVET-X2017-v1, 24th Meeting, by teleconference, Oct. 6-15, 2021, pp. 1-7.
Kotra A.M., et al., "AHG12: Virtual Boundary Processing for the New In-Loop filter tools in ECM", Joint Video Experts Team (JVET) of ITU-T SG 16 WP 3 and ISO/IEC JTC 1/SC 29, 26th Meeting, by teleconference, Apr. 20-29, 2022, No. JVET-Z0105-v3, 6 Pages.
Kuo C-W., et al., "AHG12: Cross-Component Sample Adaptive Offset", Joint Video Experts Team (JVET) of ITU-T SG 16 WP 3 and ISO/IEC JTC 1/SC 29, 22nd Meeting, by teleconference, Apr. 20-28, 2021, No. JVET-V0153-v2, pp. 1-4.
Kuo C-W., et al., "EE2-5.1: Cross-Component Sample Adaptive Offset", 23, JVET Meeting, Jul. 7, 2021-Jul. 16, 2021, Teleconference, (The Joint Video Exploration Team of ISO/IEC JTC1/SC29/WG11 and ITU-TSG.16), No. JVET-W0066, m57178, Jul. 1, 2021, XP030295926, pp. 1-5.
Lin S-Y., "CE13: In-Loop Filters Disabled Across Face Discontinuities (Test 1.1.a and Test1.1.b)", Joint Video Experts Team (JVET) of ITU-T SG 16 WP 3 and ISO/IEC JTC 1/SC 29/WG 11, 13th Meeting: Marrakech, MA, Jan. 9-18, 2019, No. JVET-M0362-v2, pp. 1-21.
Lin S-Y., "CE-13 Related: Loop Filter Disabled Across Virtual Boundaries", Joint Video Experts Team (JVET) of ITU-T SG 16 WP 3 and ISO/IEC JTC 1/SC 29/WG 11, 13th Meeting: Marrakech, MA, Jan. 9-18, 2019, No. JVET-M0892-v3, pp. 1-17.
Meng X., et al., "CCALF Virtual Boundary Issue for 4:4:4 and 4:2:2 Format", Joint Video Experts Team (JVET) of ITU-T SG 16 WP 3 and ISO/IEC JTC 1/SC 29/WG 11, 18th Meeting: by teleconference, Apr. 15-24, 2020, No. JVET-R0322-v4, 8 Pages.
Poirier T., et al., "AHG7: GDR in ECM-4.0", Joint Video Experts Team (JVET) of ITU-T SG 16 WP 3 and ISO/IEC JTC 1/SC 29, 26th Meeting, by teleconference, Apr. 20-29, 2022, No. JVET-Z0141-v4, pp. 1-3.
Strom J., et al., "CE1-related: Multiplication-free Bilateral Loop Filter", JVET-N0493_v2, Joint Video Experts Team (JVET) of ITU-T SG 16 WP 3 and ISO/IEC JTC 1/SC 29/WG 11, 14th Meeting: Geneva, CH, Mar. 19-27, 2019, pp. 1-8.
Strom J., et al., "CE5-3.1 Combination of Bilateral Filter and SAO", JVET-P0073_v3, Joint Video Experts Team (JVET) of ITU-T SG 16 WP 3 and ISO/IEC JTC 1/SC 29/WG 11, 16th Meeting: Geneva, CH, Oct. 1-11, 2019, pp. 1-18.
Strom J., et al., "EE2: Bilateral Filter in VTM, EE2 and VVenC", 22, JVET Meeting, Apr. 20, 2021-Apr. 28, 2021, Teleconference, (The Joint Video Exploration Team of ISO/IEC JTC1/SC29/WG11 and ITU-TSG.16), No. JVET-V0094-v4, m56506, Apr. 22, 2021, XP030294208, pp. 1-11.
Wang L., et al., "AHG 7: GDR without encoder constraints for ECM", Joint Video Experts Team (JVET) of ITU-T SG 16 WP 3 and ISO/IEC JTC 1/SC 29, 25th Meeting, by teleconference, Jan. 12-21, 2022, No. JVET-Y0163-r2, pp. 1-4.
Wikipedia: "Sobel-Operator", Retrieved on Jul. 13, 2023, pp. 1-3.

VIRTUAL BOUNDARY PROCESSING FOR CCSAO, BILATERAL FILTER AND ADAPTIVE LOOP FILTER FOR VIDEO CODING

This application claims the benefit of U.S. Provisional Application No. 63/362,932, filed Apr. 13, 2022, the entire contents of which are hereby incorporated by reference.

TECHNICAL FIELD

This disclosure relates to video coding, including video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), ITU-T H.266/Versatile Video Coding (VVC), and extensions of such standards, as well as proprietary video codecs/formats such as AOMedia Video 1 (AV1) developed by the Alliance for Open Media. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques related to sample enhancement techniques performed in-loop with a video coding process. In particular, following decoding of a block of video data (whether by a video encoder or a video decoder), the decoded block may be enhanced using one or more of a variety of filtering techniques, such as deblocking filtering, bilateral interpolation filtering, sample adaptive offset filtering, and/or cross-component sample adaptive offset filtering. Virtual boundaries may be present in a picture of video to allow for parallel encoding and/or decoding of the picture. However, virtual boundaries may cross through a block of video data, which may prevent filtering when samples need to be accessed on both sides of the virtual boundary. This disclosure describes various techniques that may be used to nevertheless allow filtering, e.g., CCSAO and BIF, on a sample when one or more neighboring samples to the sample are along or across a virtual boundary.

In one example, a method of decoding video data includes decoding a current block of video data to form a decoded block; determining that a current sample of the decoded block neighbors a sample along a virtual boundary in the decoded block and neighbors one or more samples that are not along any virtual boundary in the decoded block; computing band information for cross component sample adaptive offset (CCSAO) for the current sample using at least one of the one or more samples that are not along any virtual boundary in the decoded block and without using the sample along the virtual boundary; and performing CCSAO on the current sample using the band information.

In another example, a device for decoding video data includes a memory configured to store video data; and one or more processors implemented in circuitry and configured to: decode a current block of the video data to form a decoded block; determine that a current sample of the decoded block neighbors a sample along a virtual boundary in the decoded block and neighbors one or more samples that are not along any virtual boundary in the decoded block; compute band information for cross component sample adaptive offset (CCSAO) for the current sample using at least one of the one or more samples that are not along any virtual boundary in the decoded block and without using the sample along the virtual boundary; and perform CCSAO on the current sample using the band information.

In another example, a computer-readable storage medium having stored thereon instructions that, when executed, cause a processor to: decode a current block of video data to form a decoded block; determine that a current sample of the decoded block neighbors a sample along a virtual boundary in the decoded block and neighbors one or more samples that are not along any virtual boundary in the decoded block; compute band information for cross component sample adaptive offset (CCSAO) for the current sample using at least one of the one or more samples that are not along any virtual boundary in the decoded block and without using the sample along the virtual boundary; and perform CCSAO on the current sample using the band information.

In another example, a device for decoding video data includes means for decoding a current block of video data to form a decoded block; means for determining that a sample of the decoded block neighbors a sample along a virtual boundary in the decoded block and neighbors one or more samples that are not along any virtual boundary in the decoded block; means for computing band information for cross component sample adaptive offset (CCSAO) for the sample using at least one of the one or more samples that are not along any virtual boundary in the decoded block and without using the sample along the virtual boundary; and means for performing CCSAO on the sample using the band information.

The details of one or more examples are set forth in the accompanying drawings and the description below. Other features, objects, and advantages will be apparent from the description, drawings, and claims.

BRIEF DESCRIPTION OF DRAWINGS

FIGS. 8A-8D are conceptual diagrams illustrating respective directional patterns for edge offset (EO) sample classification.

DETAILED DESCRIPTION

Figure 1:
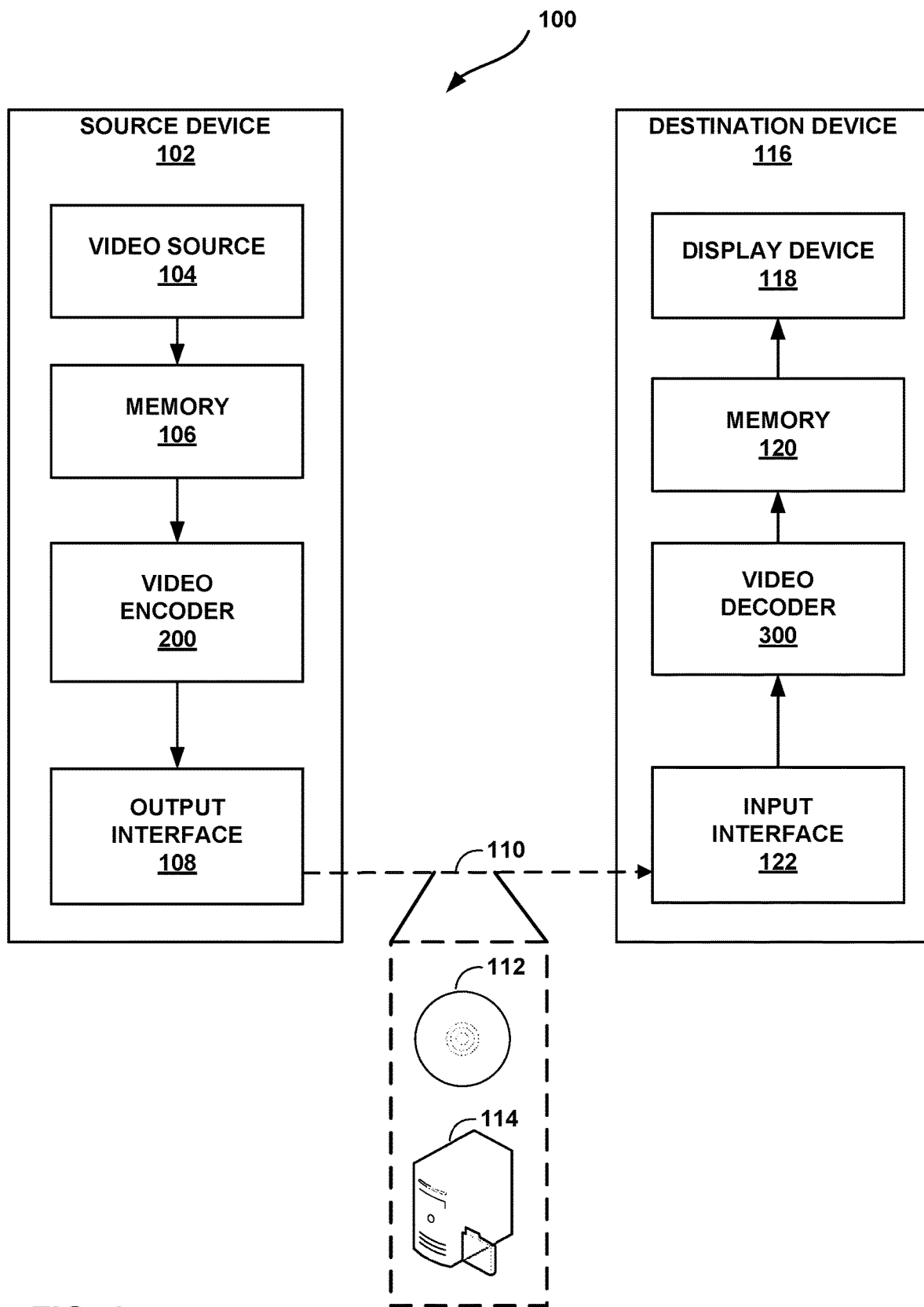
FIG. 1 is a block diagram illustrating an example video encoding and decoding system that may perform the techniques of this disclosure.

Video coding generally includes partitioning pictures into blocks (e.g., coding units (CUs)) and then coding (encoding or decoding) each of the blocks. Coding a current block generally includes forming a prediction block for the current block and coding a residual block representing differences between the original block and the prediction block. Forming the prediction block may include using samples within the current picture (intra-prediction) or samples in one or more previously coded, reference pictures (inter-prediction).

Both video encoders and video decoders decode (i.e., reconstruct) blocks of video data. Video encoders first encode the blocks, then decode/reconstruct the blocks for use in prediction of subsequently coded blocks of video data. In some cases, following decoding/reconstruction of blocks of video data, a video coder (encoder or decoder) may enhance the reconstructed blocks using one or more techniques, such as adaptive loop filtering, sample adaptive offsets, bilateral interpolation, or the like.

In some cases, a video decoder may begin decoding video data at a picture that is not the ordinal first picture of a video bitstream including the video data. For example, a user may have requested to seek or fast forward to a particular temporal location in the video data, or the user may have tuned into a channel including the video data at a time later than a start time for the video data. Such accesses to the video data are generally referred to as "random access." Because a video bitstream may be randomly accessed in such a manner, certain pictures are used as decoder refresh pictures. That is, some or all of a decoder refresh picture will not be inter-predicted using previously decoded pictures. In some cases, pictures may be encoded to support "gradual decoder refresh," which includes coding a first portion of the pictures, up to a virtual boundary, without using inter-prediction, and coding a second portion of the pictures past the virtual boundary using any coding mode. This allows these pictures to support random access while also reducing bitrate for encoded versions of the pictures.

Certain techniques of this disclosure include performing cross-component sample adaptive offset (CCSAO) application to reconstructed blocks. In particular, for a current sample (pixel) of a block, a video coder may determine an offset value to apply to the value of the current sample according to a "band" in which the value for a neighboring sample to the current sample belongs. The band may also be considered a category or classification, and each band may be associated with a different offset value. The video encoder may signal an offset value to be applied to samples for each of the various bands. The video decoder may then determine a band to which a neighboring sample belongs and apply the offset value corresponding to that band to the current sample.

This disclosure recognizes that when a sample lies along or next to a virtual boundary, not all neighboring samples may be available for that sample (e.g., due to random access. Thus, according to the techniques of this disclosure, a video coder (encoder or decoder) may disable CCSAO for samples along a virtual boundary. Moreover, the video coder may perform CCSAO for samples next to a virtual boundary, but without considering values of neighboring samples that are along the virtual boundary.

When performing bilateral filtering (BIF), a video coder calculates a filtered value for a current sample using a diamond shaped region of neighboring samples. Such neighboring samples may be referred to as the "filter support" samples, because filter coefficients may be mathematically applied to the neighboring samples to calculate a filtered value for the current sample. This disclosure recognizes that when a filter support sample lies on or across a virtual boundary relative to the current sample, the filter support sample may not be available for use when performing BIF for the current sample. Thus, according to the techniques of this disclosure, the video coder may pad values of filter support samples along or across the virtual boundary using other samples on the same side of the virtual boundary as the current sample.

For adaptive loop filtering (ALF), according to the techniques of this disclosure, a minimum padding size may be increased, e.g., to 6 samples. For CCALF, the minimum padding size may be increased, e.g., to 4 samples.

In this manner, the techniques of this disclosure may improve sample enhancement processes such as filtering, SAO, and CCSAO. That is, these techniques allow these various enhancement processing techniques to be performed when virtual boundaries are used, thereby further improving bitrate for the video bitstream while also improving fidelity (accuracy) of the decoded/reconstructed video data.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, uncoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, mobile devices, tablet computers, set-top boxes, telephone handsets such as smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for enhancing samples of video data. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for enhancing samples of video data. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, uncoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream.

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). In other examples, video encoder 200 and video decoder 300 may operate according to a proprietary video codec/format, such as AOMedia Video 1 (AV1), extensions of AV1, and/or successor versions of AV1 (e.g., AV2). In other examples, video encoder 200 and video decoder 300 may operate according to other proprietary formats or industry standards. The techniques of this disclosure, however, are not limited to any particular coding standard or format. In general, video encoder 200 and video decoder 300 may be configured to perform the techniques of this disclosure in conjunction with any video coding techniques that include enhancing samples of video data.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

When operating according to the AV1 codec, video encoder 200 and video decoder 300 may be configured to code video data in blocks. In AV1, the largest coding block that can be processed is called a superblock. In AV1, a superblock can be either 128×128 luma samples or 64×64 luma samples. However, in successor video coding formats (e.g., AV2), a superblock may be defined by different (e.g., larger) luma sample sizes. In some examples, a superblock is the top level of a block quadtree. Video encoder 200 may further partition a superblock into smaller coding blocks. Video encoder 200 may partition a superblock and other coding blocks into smaller blocks using square or non-square partitioning. Non-square blocks may include N/2×N, N×N/2, N/4×N, and N×N/4 blocks. Video encoder 200 and video decoder 300 may perform separate prediction and transform processes on each of the coding blocks.

AV1 also defines a tile of video data. A tile is a rectangular array of superblocks that may be coded independently of other tiles. That is, video encoder 200 and video decoder 300 may encode and decode, respectively, coding blocks within a tile without using video data from other tiles. However, video encoder 200 and video decoder 300 may perform filtering across tile boundaries. Tiles may be uniform or non-uniform in size. Tile-based coding may enable parallel processing and/or multi-threading for encoder and decoder implementations.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning, QTBT partitioning, MTT partitioning, superblock partitioning, or other partitioning structures.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component may be an array or single sample from one of the three arrays (luma and two chroma) for a picture in 4:2:0, 4:2:2, or 4:4:4 color format, or an array or a single sample of the array for a picture in monochrome format. In some examples, a coding block is an M×N block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile. The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

AV1 includes two general techniques for encoding and decoding a coding block of video data. The two general techniques are intra prediction (e.g., intra frame prediction or spatial prediction) and inter prediction (e.g., inter frame prediction or temporal prediction). In the context of AV1, when predicting blocks of a current frame of video data using an intra prediction mode, video encoder 200 and video decoder 300 do not use video data from other frames of video data. For most intra prediction modes, video encoder 200 encodes blocks of a current frame based on the difference between sample values in the current block and predicted values generated from reference samples in the same frame. Video encoder 200 determines predicted values generated from the reference samples based on the intra prediction mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

After decoding (also referred to as "reconstructing") a block of video data, video encoder 200 and video decoder 300 may enhance samples of the block using one or more of a variety of techniques, such as sample adaptive offset (SAO), cross-component sample adaptive offset (CCSAO), or filtering, such as adaptive loop filtering (ALF), boundary filtering, cross-component adaptive loop filtering (CCALF), or the like.

The Enhanced Compression Model (ECM) of video coding includes Cross Component SAO (CCSAO) and Bilateral Filter (BIF). Sample adaptive offset (SAO), CCSAO, and BIF operate in parallel in ECM. Moreover, the adaptive loop filter (ALF) maximum filter size footprint is increased to a 13×13 diamond shape. Furthermore, the Cross-component ALF (CCALF) footprint (filter size) has also been increased to a 25-tap long filter.

In VVC, the concept of virtual boundary (VB) processing for in-loop filter is used to de-activate the application of in-loop filters on discontinuous edges (for example, in 360-degree video). The basic concept of virtual boundary processing is that the samples which are across a given virtual boundary are said to be not available for processing of samples on the other side of the virtual boundary. Therefore, all the samples which are left of a "vertical virtual boundary" are said to be not available for filtering purposes when filtering samples on the right of the vertical virtual boundary. Similarly, for a horizontal boundary, all the samples above the horizontal virtual boundary are said to be not available for purposes of filtering samples below the horizontal virtual boundary.

In VVC, the virtual boundary processing is applied to both SAO and ALF. For the SAO band offset (BO), there is no need for any preprocessing or filtering change as the "band" information is determined purely based on the current sample that is being filtered. Therefore, for SAO BO, there is no dependency on other neighboring samples. However, for SAO edge offset (EO), the four 1D directions (spatial neighbors) are checked and the filtering of the sample is disabled if the given sample falls on the virtual boundary or its neighboring sample (based on the EO direction) falls outside the boundary. For the ALF in VVC, the virtual boundary processing is done by "repetitive padding" to replace the unavailable samples.

Moreover, VVC also supports a functionality called Gradual Decoding Refresh (GDR). To achieve the GDR functionality, VVC disables the loop filtering across the virtual boundaries.

However, the techniques of this disclosure allow virtual boundary (VB) processing for loop filter stages including BIF and CCSAO. These techniques also include modifications to the virtual boundary (VB) processing for ALF and CCALF.

To filter a luma sample, three different classifiers ($C_0$, $C_1$ and $C_2$) and three different sets of filters ($F_0$, $F_1$ and $F_2$) are used. Sets $F_0$ and $F_1$ contain fixed filters, with coefficients trained for classifiers $C_0$ and $C_1$. Coefficients of filters in $F_2$ are signalled. Which filter from a set $F_i$ is used for a given sample is decided by a class $C_i$ assigned to this sample using classifier $C_i$.

At first, two 13×13 diamond shape fixed filters $F_0$ and $F_1$ are applied to derive two intermediate samples $R_0(x, y)$ and $R_1(x, y)$. After that, $F_2$ is applied to $R_0(x, y)$, $R_1(x, y)$, and neighboring samples to derive a filtered sample as:

$$\tilde{R}(x, y) = R(x, y) + \left[\sum_{i=0}^{19} c_i(f_{i,0} + f_{i,1})\right] + \left[\sum_{i=20}^{21} c_i g_i\right],$$

where $f_{i,j}$ is the clipped difference between a neighboring sample and current sample $R(x, y)$ and $g_i$ is the clipped difference between $R_{i-20}(x, y)$ and current sample. The filter coefficients $c_i$, i=0, . . . 21, are signalled.

Based on directionality $D_i$ and activity $\hat{A}_i$, a class $C_i$ is assigned to each 2×2 block:

$$C_i = \hat{A}_i * M_{D,i} + D_i$$

where $M_{D,i}$ represents the total number of directionalities $D_i$.

As in VVC, values of the horizontal, vertical, and two diagonal gradients are calculated for each sample using 1-D Laplacian. The sum of the sample gradients within a 4×4 window that covers the target 2×2 block is used for classifier $C_0$ and the sum of sample gradients within a 12×12 window is used for classifiers $C_1$ and $C_2$. The sums of horizontal, vertical and two diagonal gradients are denoted, respectively, as $g_h^i$, $g_v^i$, $g_{d1}^i$ and $g_{d2}^i$. The directionality $D_i$ is determined by comparing:

$$r_{h,v}^i = \frac{\max(g_h^i, g_v^i)}{\min(g_h^i, g_v^i)}, r_{d1,d2}^i = \frac{\max(g_{d1}^i, g_{d2}^i)}{\min(g_{d1}^i, g_{d2}^i)}$$

with a set of thresholds.

The directionality $D_2$ is derived as in VVC using thresholds 2 and 4.5. For $D_0$ and $D_1$, horizontal/vertical edge strength $E_{HV}^i$ and diagonal edge strength $E_D^i$ are calculated first. Thresholds Th=[1.25, 1.5, 2, 3, 4.5, 8] are used. Edge strength $E_{HV}^i$ is 0 if $r_{h,v}^i \leq TH[0]$; otherwise, $E_{HV}^i$ is the maximum integer such that $r_{h,v}^i > Th[E_{HV}^i - 1]$. Edge strength $E_D^i$ is 0 if $r_{d1,d2}^i \leq Th[0]$; otherwise, $E_D^i$ is the maximum integer such that $r_{d1,d2}^i > Th[E_D^i - 1]$. When $r_{h,v}^i > r_{d1,d2}^i$, i.e., horizontal/vertical edges are dominant, the $D_i$ is derived by using Table 1(a); otherwise, diagonal edges are dominant, the $D_i$ is derived by using Table 1(b):

TABLE 1

| | (a) $E_D^i$ | | | | | | | | (b) $E_{HV}^i$ | | | | | | |
|---|---|---|---|---|---|---|---|---|---|---|---|---|---|---|---|
| $E_{HV}^i$ | 0 | 1 | 2 | 3 | 4 | 5 | 6 | $E_D^i$ | 0 | 1 | 2 | 3 | 4 | 5 | 6 |
| 0 | 0 | 0 | 0 | 0 | 0 | 0 | 0 | 0 | 28 | 0 | 0 | 0 | 0 | 0 | 0 |
| 1 | 1 | 2 | 0 | 0 | 0 | 0 | 0 | 1 | 29 | 30 | 0 | 0 | 0 | 0 | 0 |
| 2 | 3 | 4 | 5 | 0 | 0 | 0 | 0 | 2 | 31 | 32 | 33 | 0 | 0 | 0 | 0 |
| 3 | 6 | 7 | 8 | 9 | 0 | 0 | 0 | 3 | 34 | 35 | 36 | 37 | 0 | 0 | 0 |
| 4 | 10 | 11 | 12 | 13 | 14 | 0 | 0 | 4 | 38 | 39 | 40 | 41 | 42 | 0 | 0 |
| 5 | 15 | 16 | 17 | 18 | 19 | 20 | 0 | 5 | 43 | 44 | 45 | 46 | 47 | 48 | 0 |
| 6 | 21 | 22 | 23 | 24 | 25 | 26 | 27 | 6 | 49 | 50 | 51 | 52 | 53 | 54 | 55 |

To obtain $\hat{A}_i$, the sum of vertical and horizontal gradients $A_i$ is mapped to the range of 0 to n, where n is equal to 4 for $\hat{A}_2$ and 15 for $\hat{A}_0$ and $\hat{A}_1$.

In an ALF_APS, up to 4 luma filter sets are signalled, each set may have up to 25 filters.

Classification in ALF is extended with an additional alternative classifier. For a signalled luma filter set, a flag is signalled to indicate whether the alternative classifier is applied. Geometrical transformation is not applied to the alternative band classifier. When the band-based classifier is applied, the sum of sample values of a 2×2 luma block is calculated at first. Then the class index is calculated as below:

class_index=(sum*25)>>(sample bit depth+2)

Figure 2:
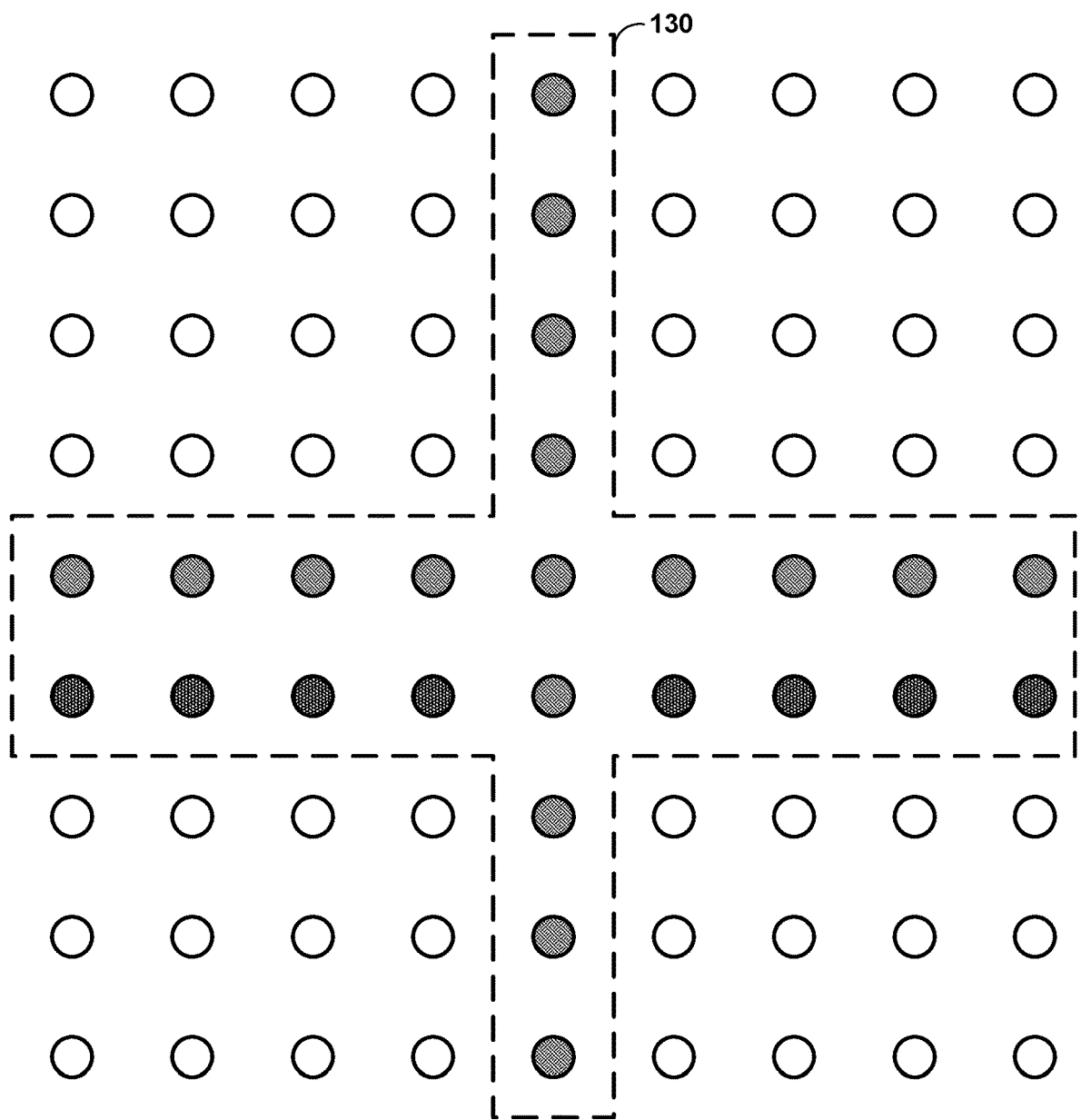
FIG. 2 is a conceptual diagram illustrating an example 25-tap filter used in a cross-component adaptive loop filter (CCALF) process.

FIG. 2 is a conceptual diagram illustrating an example 25-tap filter 130 used in a cross-component adaptive loop filter (CCALF) process. The CCALF process uses a linear filter to filter luma sample values and generate a residual correction for the chroma samples. The example 25-tap filter 130 of FIG. 2 may be used in the CCALF process. For a given slice, video encoder 200 may collect statistics of the slice, analyze the statistics, and signal up to 16 filters using an adaptation parameter set (APS). Each slice may signal an APS ID indicating which APS is to be used to decode the slice, and thus, which filters are to be used to filter data of the slice when performing CCALF.

Figure 3:
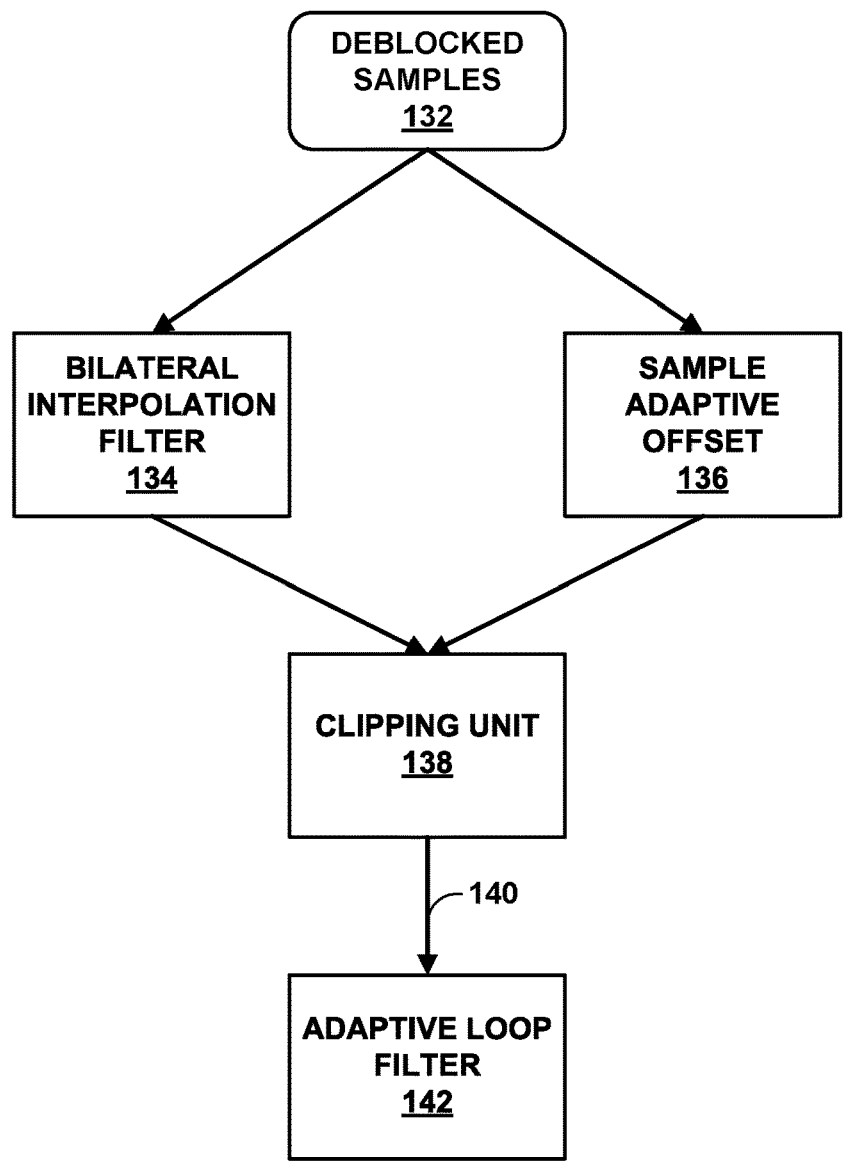
FIG. 3 is a conceptual diagram illustrating concurrent bilateral filter (BIF) and sample adaptive offset (SAO) processes.

FIG. 3 is a conceptual diagram illustrating a concurrent bilateral filter (BIF) 134 process and a sample adaptive offset (SAO) process 136. Initially, a deblocking operation is performed, generating deblocked samples 132. Filtering of deblocked samples 132 may be carried out in an in-loop-filter stage including SAO process 136 and in BIF process 134, as shown in FIG. 3. Both BIF process 134 and SAO process 136 may use samples following deblocking as input. Each filter creates an offset per sample, and these offsets may be added to the input sample. Clipping unit 138 may then clip the resulting samples, forming clipped samples 140, which may be sent to adaptive loop filter (ALF) 142.

In detail, the output sample $I_{OUT}$ may be obtained as:

$$I_{OUT} = \text{clip3}(I_C + \Delta I_{BIF} + \Delta I_{SAO}) \quad \text{(Eq. 1)}$$

where $I_C$ is the input sample from deblocking, $\Delta I_{BIF}$ is the offset from the bilateral filter and $\Delta I_{SAO}$ is the offset from SAO.

The implementation provides the possibility for the encoder to enable or disable filtering at the CTU and slice level. Video encoder 200 may make a decision by evaluating a rate-distortion optimization (RDO) cost.

Figure 4:
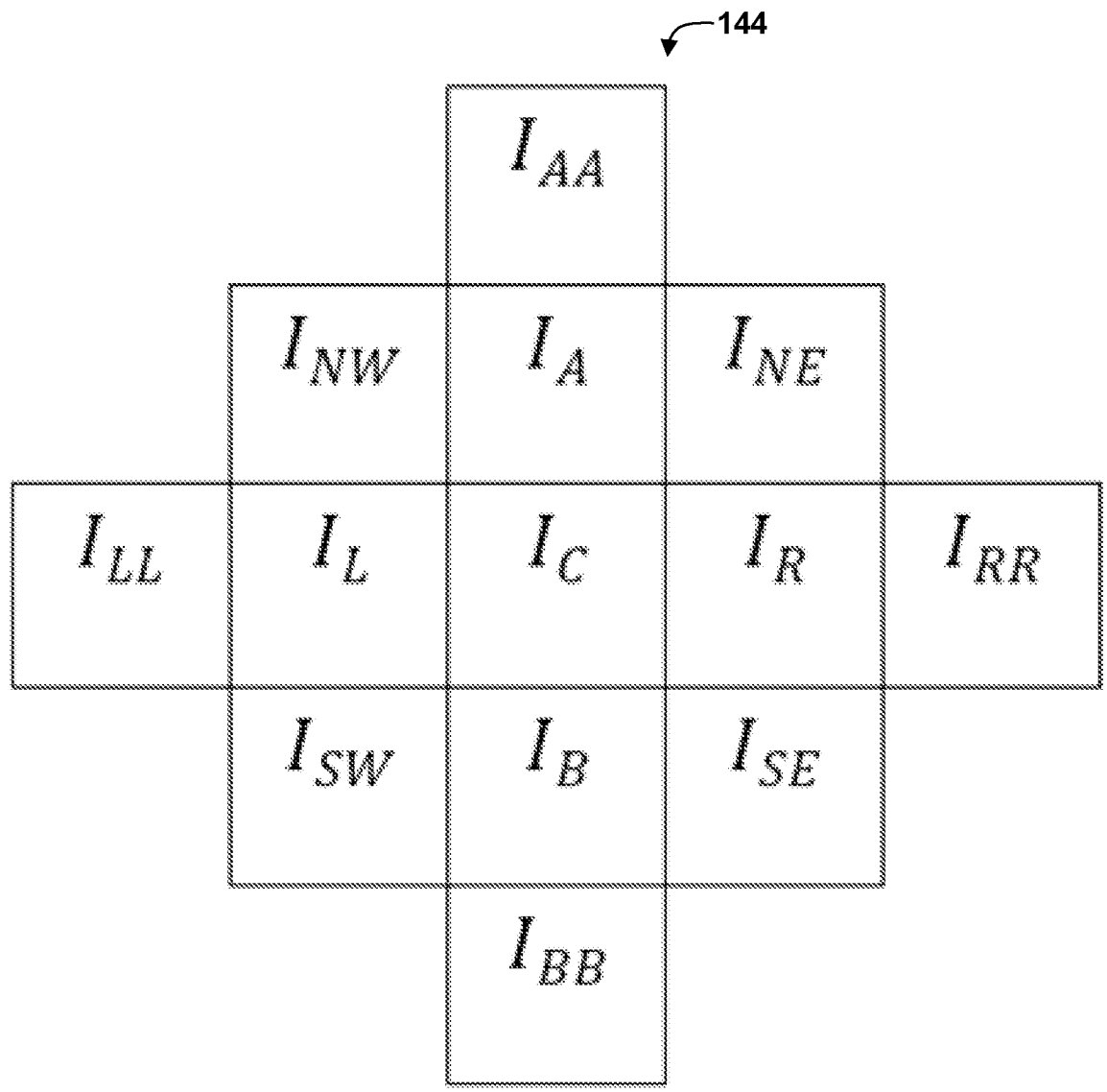
FIG. 4 is a conceptual diagram illustrating an example diamond shaped filter and a coefficient naming convention.

FIG. 4 is a conceptual diagram illustrating an example diamond shaped filter 144 and a coefficient naming convention. For CTUs that are filtered, the filtering process may proceed as follows.

At a picture border, when samples are unavailable (e.g., because diamond shaped filter 144 is centered on picture-border samples), the bilateral filter may use an extension (sample repetition) to fill in values for unavailable samples. For virtual boundaries, the behavior is conventionally the same as for SAO, i.e., no filtering occurs. When crossing horizontal CTU borders, the bilateral filter can access the same samples as SAO is able to access. As an example, if the center sample $I_C$ (per FIG. 4) is located on the top line of a CTU, $I_{NW}$, $I_A$ and $I_{NE}$ are read from the CTU above, just like SAO does, but $I_{AA}$ is padded, so no extra line buffer is needed, compared to Strom et al., "CE5-3.1 Combination of bilateral filter and SAO," Joint Video Experts Team (JVET) of ITU-T SG 16 WP 3 and ISO/IEC JTC 1/SC 29/WG 11 16th Meeting, Geneva, CH, 1-11 Oct. 2019, Document No. JVET-P0073_v3 (hereinafter, "JVET-P0073").

The samples surrounding the center sample $I_C$ are denoted according to FIG. 4, where A, B, L and R stands for above, below, left, and right, and where NW, NE, SW, SE stands for north-west etc. Likewise, AA stands for above-above, BB for below-below etc. This diamond shape is different from JVET-P0073, which used a square filter support, not using $I_{AA}$, $I_{BB}$, $I_{LL}$, or $I_{RR}$.

Each surrounding sample $I_A$, $I_R$ etc will contribute with a corresponding modifier value $\mu_{\Delta I_A}$, $\mu_{\Delta I_R}$ etc. These are calculated the following way: Starting with the contribution from the sample to the right, $I_R$, the difference is calculated according to:

$$\Delta I_R = (|I_R - I_C| + 4) >> 3 \quad \text{(Eq. 2)}$$

where |·| denotes absolute value. For data that is not 10-bit, instead $\Delta I_R = (|I_R - I_C| + 2^{n-6}) >> (n-7)$ may be used, where n=8 for 8-bit data etc. The resulting value is then clipped so that it is smaller than 16:

$$sI_R = \min(15, \Delta I_R) \quad \text{(Eq. 3)}$$

The modifier value is then calculated as:

$$\mu_{\Delta I_R} = \begin{cases} LUT_{ROW}[sI_R], & \text{if } I_R - I_C \geq 0, \\ -LUT_{ROW}[sI_R] & \text{otherwise} \end{cases} \quad \text{(Eq. 4)}$$

where $LUT_{ROW}[\,]$ is an array of 16 values determined by the value of qpb=clip(0, 25, QP+bilateral_filter_qp_offset-17):
{0, 0, 0, 0, 0, 0, 0, 0, 0, 0, 0, 0, 0, 0, 0,}, if qpb=0
{0, 1, 1, 1, 1, 0, 0, 0, 0, 0, 0, 0, 0, 0, 0,}, if qpb=1
{0, 2, 2, 2, 1, 1, 0, 1, 0, 0, 0, 0, 0, 0, 0,}, if qpb=2
{0, 2, 2, 2, 2, 1, 1, 1, 1, 1, 1, 0, 1, 1, −1,}, if qpb=3
{0, 3, 3, 3, 2, 2, 1, 2, 1, 1, 1, 1, 0, 1, 1, −1,}, if qpb=4
{0, 4, 4, 4, 3, 2, 1, 2, 1, 1, 1, 0, 1, 1, −1,}, if qpb=5
{0, 5, 5, 5, 4, 3, 2, 2, 2, 2, 1, 0, 1, 1, −1,}, if qpb=6
{0, 6, 7, 7, 5, 3, 3, 3, 2, 2, 1, 1, 1, 1, −1,}, if qpb=7
{0, 6, 8, 8, 5, 4, 3, 3, 3, 3, 2, 1, 2, 2, −2,}, if qpb=8
{0, 7, 10, 10, 6, 4, 4, 4, 3, 3, 2, 2, 2, 2, −2,}, if qpb=9
{0, 8, 11, 11, 7, 5, 5, 4, 5, 4, 4, 2, 2, 2, 2, −2,}, if qpb=10
{0, 8, 12, 13, 10, 8, 8, 6, 6, 6, 5, 3, 3, 3, 3, −2,}, if qpb=11
{0, 8, 13, 14, 13, 12, 11, 8, 8, 7, 7, 5, 5, 4, 4, −2,}, if qpb=12
{0, 9, 14, 16, 16, 15, 14, 11, 9, 9, 8, 6, 6, 5, 6, −3,}, if qpb=13
{0, 9, 15, 17, 19, 19, 17, 13, 11, 10, 10, 8, 8, 6, 7, −3,}, if qpb=14
{0, 9, 16, 19, 22, 22, 20, 15, 12, 12, 11, 9, 9, 7, 8, −3,}, if qpb=15
{0, 10, 17, 21, 24, 25, 24, 20, 18, 17, 15, 12, 11, 9, 9, −3,}, if qpb=16
{0, 10, 18, 23, 26, 28, 28, 25, 23, 22, 18, 14, 13, 11, 11, −3}, if qpb=17
{0, 11, 19, 24, 29, 30, 32, 30, 29, 26, 22, 17, 15, 13, 12, −3,}, if qpb=18
{0, 11, 20, 26, 31, 33, 36, 35, 34, 31, 25, 19, 17, 15, 14, −3,}, if qpb=19
{0, 12, 21, 28, 33, 36, 40, 40, 40, 36, 29, 22, 19, 17, 15, −3,}, if qpb=20
{0, 13, 21, 29, 34, 37, 41, 41, 41, 38, 32, 23, 20, 17, 15, −3,}, if qpb=21
{0, 14, 22, 30, 35, 38, 42, 42, 42, 39, 34, 24, 20, 17, 15, −3,}, if qpb=22
{0, 15, 22, 31, 35, 39, 42, 42, 43, 41, 37, 25, 21, 17, 15, −3,}, if qpb=23
{0, 16, 23, 32, 36, 40, 43, 43, 44, 42, 39, 26, 21, 17, 15, −3,}, if qpb=24
{0, 17, 23, 33, 37, 41, 44, 44, 45, 44, 42, 27, 22, 17, 15, −3,}, if qpb=25

This is different from JVET-P0073 where 5 such tables were used, and the same table was reused for several qp-values.

As described in JVET-N0493 section 3.1.3, these values can be stored using six bits per entry resulting in 26*16*6/8=312 bytes or 300 bytes if excluding the first row which is all zeros.

The modifier values for $\mu_{\Delta I_L}$, $\mu_{\Delta I_A}$ and $\mu_{\Delta I_B}$ are calculated from $I_L$, $I_A$ and $I_B$ in the same way. For diagonal samples $I_{NW}$, $I_{NE}$, $I_{SE}$, $I_{SW}$, and the samples two steps away $I_{AA}$, $I_{BB}$, $I_{RR}$ and $I_{LL}$, the calculation also follows Equations 2 and 3, but uses a value shifted by 1. Using the diagonal sample $I_{SE}$ as an example:

$$\mu_{\Delta I_{SE}} = \begin{cases} LUT_{ROW}[sI_{SE}] >> 1, & \text{if } I_{SE} - I_C \geq 0, \\ -(LUT_{ROW}[sI_{SE}] >> 1) & \text{otherwise} \end{cases} \quad \text{(Eq. 5)}$$

and the other diagonal samples and two-steps-away samples are calculated likewise. The modifier values are summed together:

$$m_{sum} = \mu_{\Delta I_A} + \mu_{\Delta I_B} + \mu_{\Delta I_L} + \mu_{\Delta I_R} + \mu_{\Delta I_{NW}} + \mu_{\Delta I_{NE}} + \mu_{\Delta I_{SW}} + \mu_{\Delta I_{SE}} + \mu_{\Delta I_{AA}} + \mu_{\Delta I_{BB}} + \mu_{\Delta I_{LL}} + \mu_{\Delta I_{RR}}. \quad \text{(Eq. 6)}$$

Note that $\mu_{\Delta I_R}$ equals $-\mu_{\Delta I_L}$ for the previous sample. Likewise, $\mu_{\Delta I_A}$ equals $-\mu_{\Delta I_B}$ for the sample above, and similar symmetries can be found also for the diagonal- and two-steps-away modifier values. This means that in a hardware implementation, it is sufficient to calculate the six values $\mu_{\Delta I_R}$, $\mu_{\Delta I_B}$, $\mu_{\Delta I_{SW}}$, $\mu_{\Delta I_{SE}}$, $\mu_{\Delta I_{RR}}$ and $\mu_{\Delta I_{BB}}$ the remaining six values can be obtained from previously calculated values.

The $m_{sum}$ value is now multiplied either by c=1, 2 or 3, which can be done using a single adder and logical AND gates in the following way:

$$c_v = k_1 \& (m_{sum} << 1) + k_2 \& m_{sum}, \quad \text{(Eq. 7)}$$

where & denotes logical and $k_1$ is the most significant bit of the multiplier c and $k_2$ is the least significant bit. The value to multiply with is obtained using the minimum block dimension D=min(width, height) as shown in Table 2:

TABLE 2

| Block type | D ≤ 4 | 4 < D < 16 | D ≥ 16 |
|---|---|---|---|
| Intra | 3 | 2 | 1 |
| Inter | 2 | 2 | 1 |

Finally, the bilateral filter offset $\Delta I_{BIF}$ is calculated. For full strength filtering:

$$\Delta I_{BIF} = (c_v + 16) >> 5, \quad \text{(Eq. 8)}$$

whereas for half-strength filtering:

$$\Delta I_{BIF} = (c_v + 32) >> 6. \quad \text{(Eq. 9)}$$

A general formula for n-bit data is:

$$r_{add} = 2^{14-n-bilateral\_filter\_strength}$$

$$r_{shift} = 15 - n - \text{bilateal\_filter\_strength}$$

$$\Delta I_{BIF} = (c_v + r_{add}) >> r_{shift}, \quad \text{(Eq. 10)}$$

where bilateral_filter_strength can be 0 or 1 and is signalled in the PPS.

Figure 5:
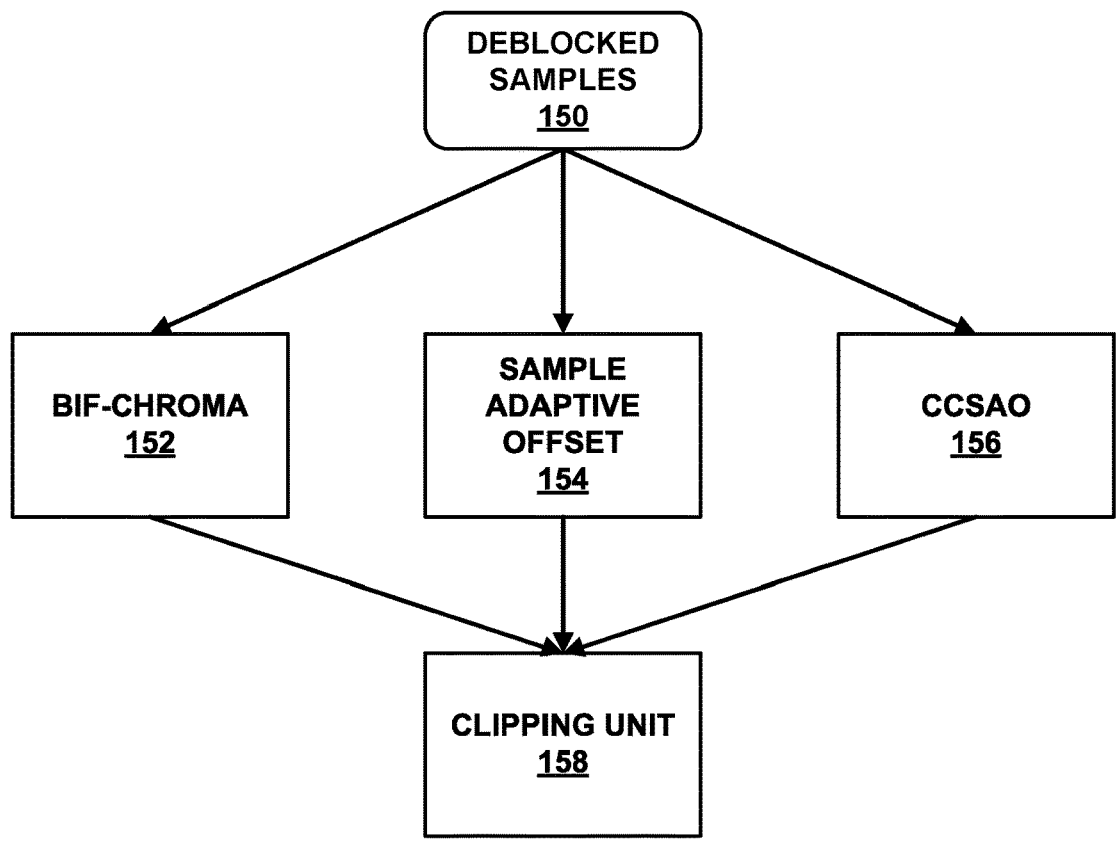
FIG. 5 is a conceptual diagram illustrating concurrent chroma bilateral filter (BIF-CHROMA), sample adaptive offset (SAO), and cross-component sample adaptive offset (CCSAO) processes.

FIG. 5 is a conceptual diagram illustrating concurrent chroma bilateral filter (BIF-CHROMA) process 152, sample adaptive offset (SAO) process 154, and cross-component sample adaptive offset (CCSAO) process 156. As with BIF-luma, BIF-chroma process 152 may also be performed in parallel with SAO process 154 and CCSAO process 156, as shown in FIG. 5. BIF-chroma process 152, CCSAO process 156, and SAO process 154 may use the same deblocked chroma samples 150 produced by the deblocking filter as input and generate three offsets per chroma sample in parallel. Then these three offsets may be added to the input chroma sample to obtain a sum, which clipping unit 158 then clips to form the final output chroma sample value. The proposed BIF-chroma provides an on/off control mechanism on CTU level and slice level.

The filtering process of BIF-chroma is similar to that of BIF-luma. For a chroma sample, a 5×5 diamond shape filter is used for generating the filtering offset. The difference between the central sample and each surrounding sample is calculated first. The coefficient for each reference sample is extracted from a pre-defined look-up-table based on the calculated difference directly. The coefficients used for chroma components are retrained, different from those from BIF-luma. In the BIF-luma design, the block-level filtering strength parameter c is determined based on luma TU size and CU mode. While in the BIF-chroma design, the parameter for chroma components is determined based the chroma TU size and mode when dual-tree partitioning is enabled for the current slice and based on the corresponding luma TU size and mode when dual-tree partitioning is disabled.

Figure 6:
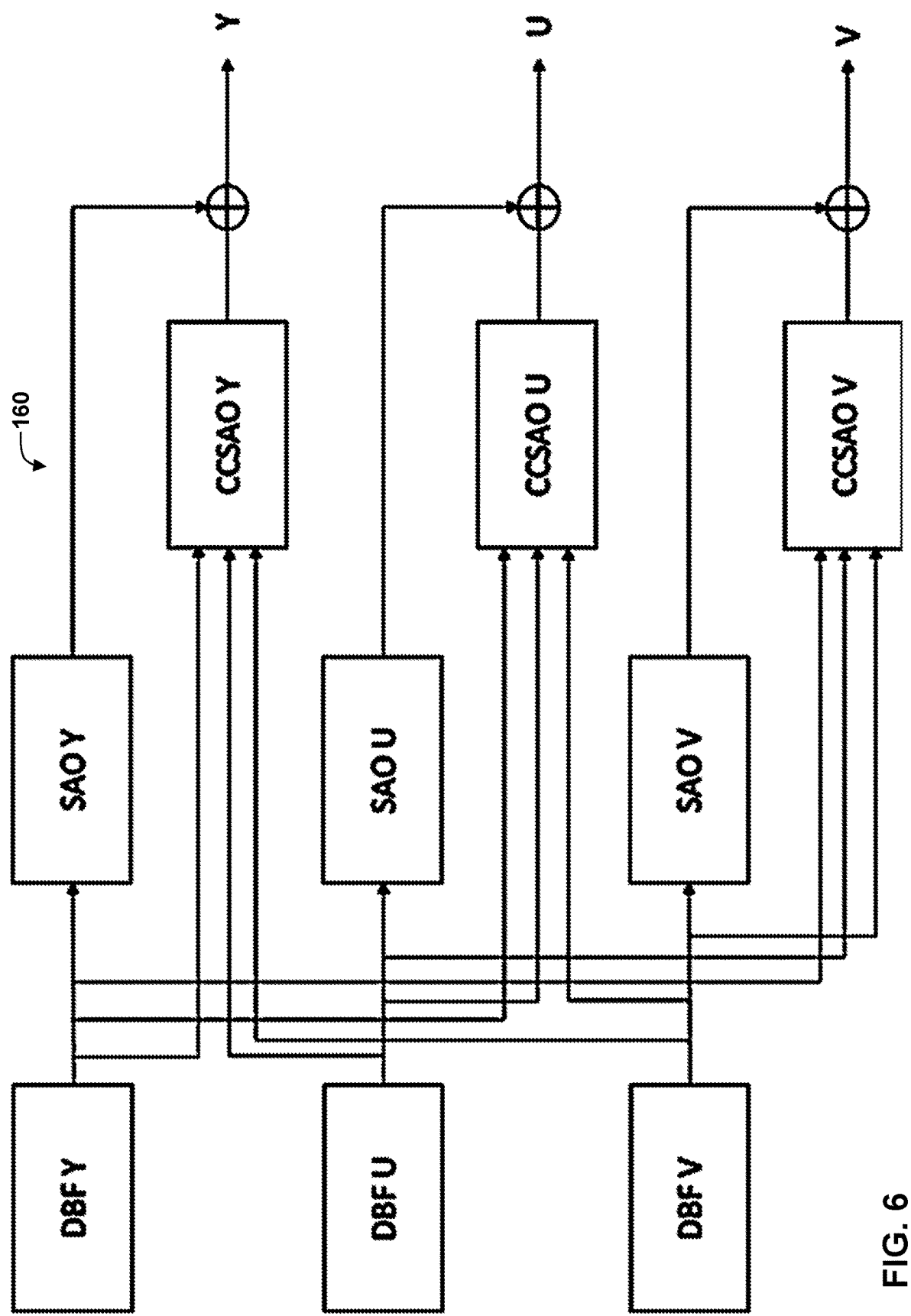
FIG. 6 is a flow diagram illustrating an example decoding workflow when cross-component sample adaptive offset (CCSAO) is applied to video data.

FIG. 6 is a flow diagram illustrating an example decoding workflow 160 when cross-component sample adaptive offset (CCSAO) is applied to video data. Similar to an SAO process, a CCSAO process classifies the reconstructed samples into different categories, properly derives one offset for each category, and adds the offset to the reconstructed samples in that category. However, different from the SAO process, which uses one single luma/chroma component of the current sample as input, the CCSAO process utilizes all three components (blue hue chroma, red hue chroma, and luminance) to classify the current sample into different categories. To facilitate the parallel processing, the output samples from the de-blocking filter are used as the input of the CCSAO.

In the current CCSAO design, to achieve one better complexity/performance trade-off, only BO is used to enhance the quality of the reconstructed samples. For a given luma/chroma sample, three candidate samples are selected to classify the given sample into different categories: one collocated Y sample, one collocated U sample, and one collocated V sample. The sample values of these three selected samples are then classified into three different $\{band_Y, band_U, band_V\}$ bands, and a joint index i is used to indicate the category of the given sample. One offset is signaled and added to the reconstructed samples that fall into that category, which can be formulated as:

$$band_Y = (Y_{col} \cdot N_Y) >> BD$$

$$band_U = (U_{col} \cdot N_U) >> BD$$

$$band_V = (V_{col} \cdot N_V) >> BD$$

$$i = band_Y \cdot (N_U \cdot N_V) + band_U \cdot N_V + band_V$$

$$C'_{rec} = \text{Clip1}(C_{rec} + \sigma_{CCSAO}[i]) \quad (11)$$

Figure 7:
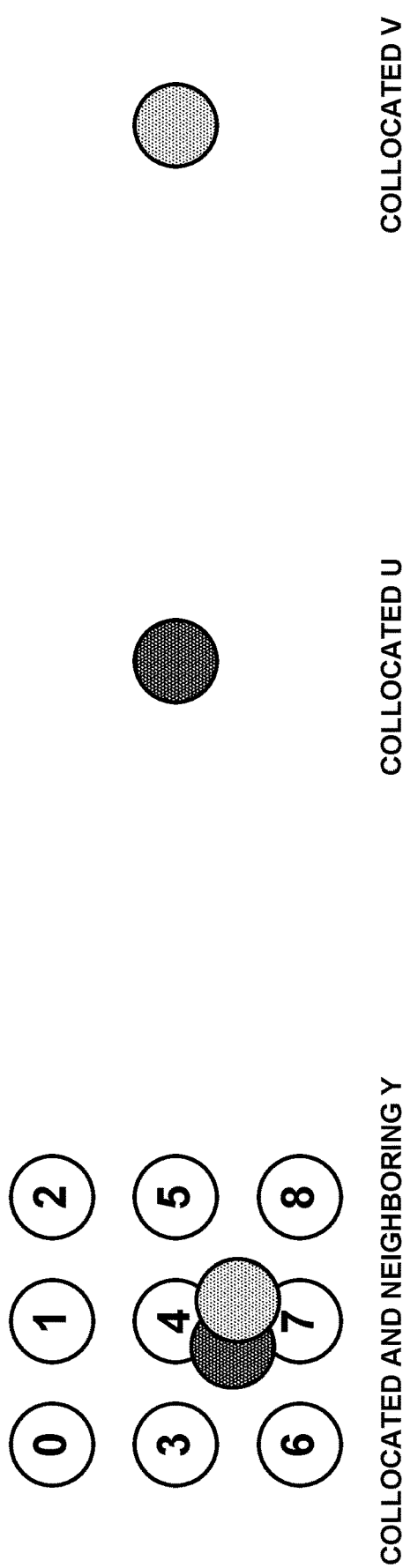
FIG. 7 is a conceptual diagram illustrating relative positions of luma and chroma samples used for cross-component sample adaptive offset (CCSAO).

FIG. 7 is a conceptual diagram illustrating relative positions of luma and chroma samples used for a cross-component sample adaptive offset (CCSAO) process. In equation (11) above, $\{Y_{col}, U_{col}, V_{col}\}$ are the three selected collocated samples that are used to classify the current sample; $\{N_Y, N_U, N_V\}$ are the numbers of equally divided bands applied to $\{Y_{col}, U_{col}, V_{col}\}$ full range respectively; BD is the internal coding bit-depth; $C_{rec}$ and $C'_{rec}$ are the reconstructed samples before and after the CCSAO is applied; $\sigma_{CCSAO}[i]$ is the value of CCSAO offset that is applied to the i-th BO category. In the current design, the collocated luma sample can be chosen from 9 candidate positions, while the collocated chroma sample positions are fixed, as depicted in FIG. 7.

Similar to SAO, different classifiers can be applied to different local region to further enhance the whole picture quality. The parameters for each classifier (i.e., the position of $Y_{col}$, $N_Y$, $N_U$, $N_V$, and offsets) are signaled in frame level, and which classifier to be used is explicitly signaled and switched in CTB level. For each classifier, the maximum of $\{N_Y, N_U, N_V\}$ is set to $\{16, 4, 4\}$, and offsets are constrained to be within the range $[-15, 15]$. The maximum classifiers per frame is constrained to be 4.

Figures 8A, 8B, 8C, 8D:
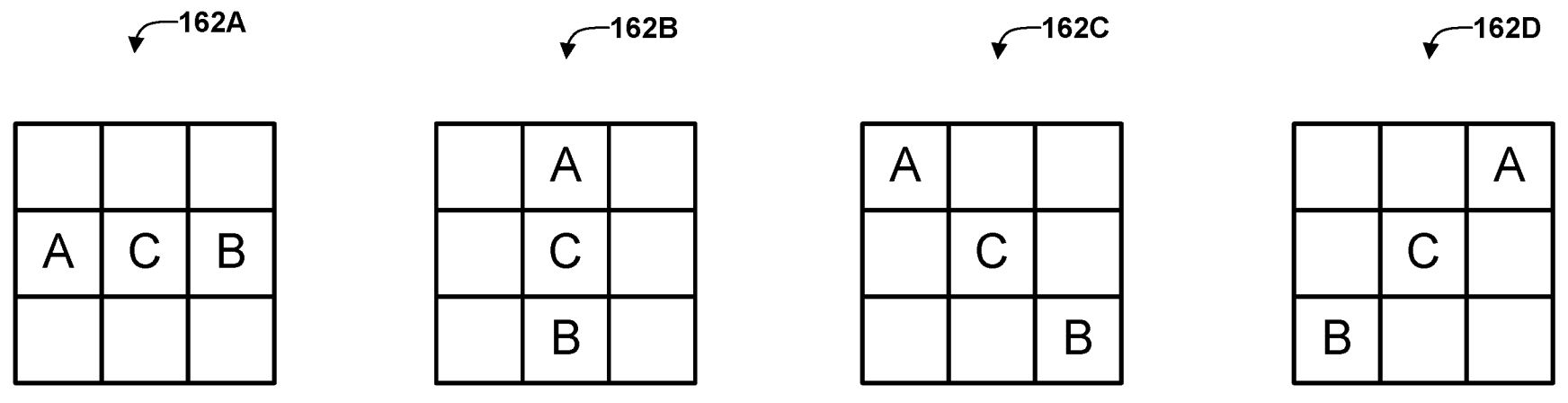

FIGS. 8A-8D are conceptual diagrams illustrating respective directional patterns for edge offset (EO) sample classification. FIG. 8A depicts horizontal directional pattern 162A, FIG. 8B depicts vertical directional pattern 162B, FIG. 8C depicts right diagonal pattern 162C, and FIG. 8D depicts left diagonal pattern 162D. The SAO filter tries to reduce the undesirable visual artifacts including ringing artifacts that could become more serious with large transforms and longer tap interpolation filters. The SAO filter tries to reduce the mean distortion between original samples and reconstructed samples by first classifying reconstructed samples into different categories, obtaining an offset for each category, and then adding the offset to each sample of the category without signaling the location of to-be-corrected samples.

The SAO filter may use different offsets sample by sample in a region depending on the sample classification, and SAO parameters are adapted from region to region. Two SAO types that are used in ECM-2.0 are edge offset (EO) and band offset (BO). For EO, the sample classification is based on comparison between current samples and neighboring samples. For BO, the sample classification is based on the sample values. Please note that each color component may have its own SAO parameters. To achieve low encoding latency and to the reduce the buffer requirement, the region size is fixed to one CTB. To reduce side information, multiple CTUs can be merged together to share SAO parameters.

EO uses four 1-D directional patterns for sample classification: horizontal, vertical, 135° diagonal, and 45° diagonal as shown in FIGS. 8A-8D, where the label "C" represents a current sample and the labels "A" and "B" represent two respective neighboring samples.

According to the above patterns, four EO classes are specified, and EO class corresponds to one pattern. Video encoder 200 may select one EO class for each CTB that enables EO. Based on rate-distortion optimization, video encoder 200 may select and send data indicating the best EO class in the bitstream as side information. Since the patterns are 1-D, the results of the classifier do not exactly correspond to extreme samples.

For a given EO class, each sample inside the CTB is classified into one of five categories. The current sample values labeled as "C" is compared with its two neighbors along the selected 1-D pattern. The classification rules for each sample are summarized in Table 3 below:

TABLE 3

SAMPLE CLASSIFICATION RULES FOR EDGE OFFSET

| Category | Condition |
| --- | --- |
| 1 | c < a && c < b |
| 2 | (c < a && c == b) \|\| (c == a && c < b) |
| 3 | (c > a && c == b) \|\| (c == a && c > b) |
| 4 | c > a && c > b |
| 0 | None of the above |

Band offset (BO) implies one offset is added to all samples of the same band. The sample value range is equally divided into 32 bands. For 8-bit samples ranging from 0 to 255, the width of a band may be 8, and sample values from 8k to 8K+7 belong to band k, where k may range from 0 to 31. Video encoder 200 may signal an average difference between the original samples and reconstructed samples in a band (i.e. offset of a band) to video decoder 300. There is no constraint on offset signs. Offsets of four consecutive bands and the starting band position may be signaled to video decoder 300.

Figure 9:
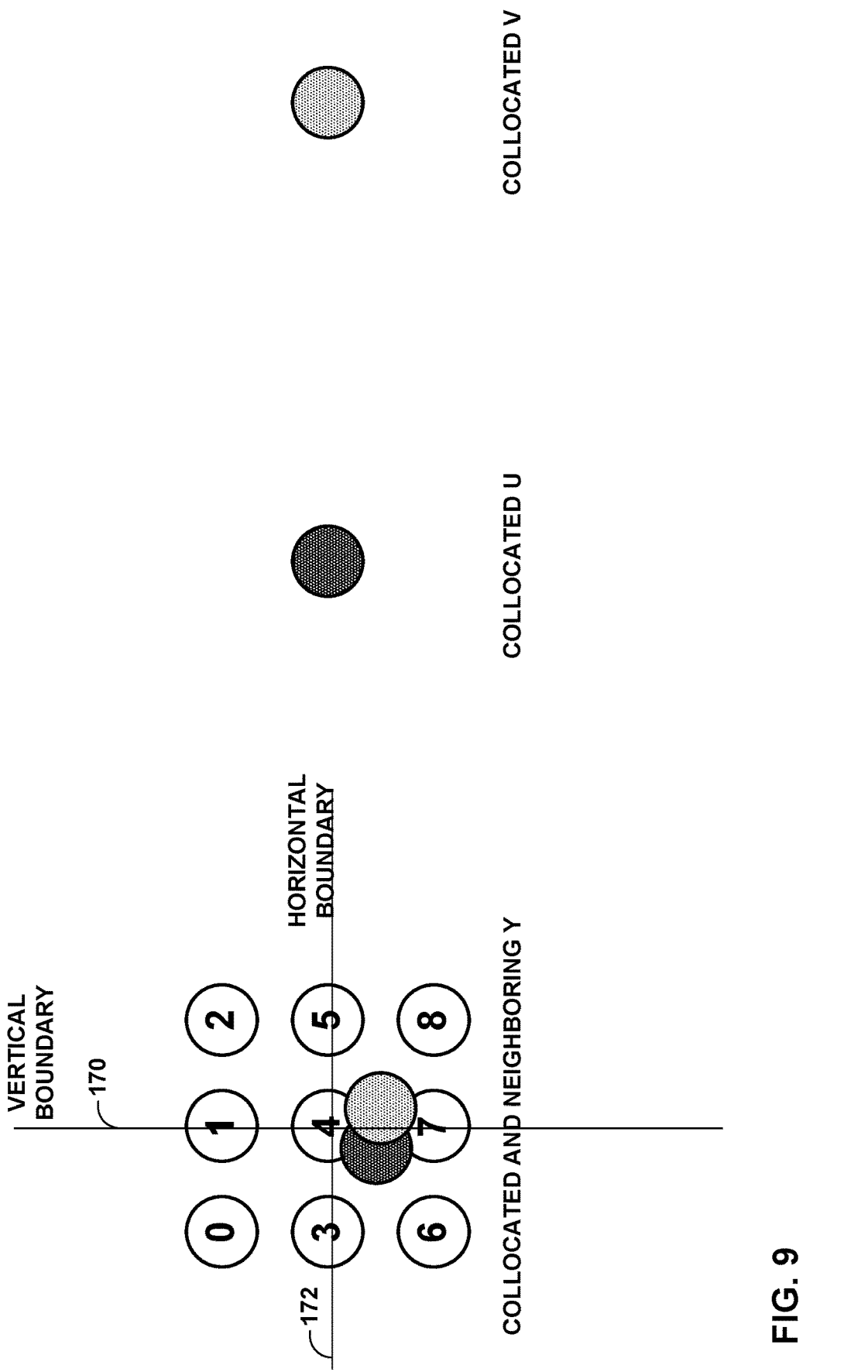
FIG. 9 is a conceptual diagram illustrating an example cross-component sample adaptive offset (CCSAO) process in the presence of virtual boundaries according to the techniques of this disclosure.

FIG. 9 is a conceptual diagram illustrating an example cross-component sample adaptive offset (CCSAO) process in the presence of virtual boundaries according to the techniques of this disclosure. In CCSAO, each sample could be classified according to a "Band Classifier" or an "Edge-Based Classifier."

Unlike the "Band Classifier (BO)" of SAO, the "Band Classifier (BO)" of CCSAO uses the spatial neighbors to compute the band information for a given sample.

CCSAO virtual boundary processing for "vertical" boundaries, such as vertical virtual boundary 170, may include the following. For vertical virtual boundary 170, whose position is given by an "X" coordinate value (say, X_VerPosVB), the filtering of a given sample "A" with coordinate (x-pos, y-pos) is as follows:

All the neighboring samples of the given sample "A" for which the given condition (x-pos==X_VerPosVB) (x-pos==X_VerPosVB−1)), is evaluated to be true, are said to be "Not Available." Therefore, the filtering of the given sample is disabled if the given samples x-pos is same as the "X" coordinate of the vertical virtual boundary and also the filtering is disabled if a neighboring sample which is not available is chosen to derive the "band" information.

For example, in FIG. 9, for sample 4, the filtering is disabled, as the x-pos of sample 4 is same as the "X" coordinate of vertical virtual boundary 170.

CCSAO virtual boundary processing for "horizontal" boundaries, such as horizontal virtual boundary 172, may be performed as follows. For horizontal virtual boundary 172, whose position is given by a "Y" coordinate value (say, Y_VerPosVB), the filtering of a given sample "A" with coordinate (x-pos, y-pos) is as follows:

All the neighboring samples of the given sample "A" for which the given condition (y-pos==Y_VerPosVB) (y-pos==Y_VerPosVB−1)), is evaluated to be true, are said to be "Not Available." Therefore, the filtering of the given sample is disabled if the given samples y-pos is same as the "Y" coordinate of horizontal virtual boundary 172, and also, the filtering is disabled if a neighboring sample which is not available is chosen to derive the "band" information.

For example, in FIG. 9, for sample 4, the filtering is disabled, as the y-pos of sample 4 is same as the "Y" coordinate of horizontal virtual boundary 172.

In general, CCSAO filtering is not applied for a given sample when the given sample falls on a virtual boundary (either horizontal virtual boundary 172 or vertical virtual boundary 170). Also, a given spatial neighbor is ascertained to be not available if the spatial neighbor is immediately adjacent to a virtual boundary. For horizontal virtual boundary 172, all the samples above horizontal virtual boundary 172 are said to be not available (e.g., samples 0, 1, and 2). Similarly, for vertical virtual boundary 170, all samples to the left of vertical virtual boundary 170 are said to be not available (e.g., samples 0, 3, and 6).

To generalize for CCSAO BO, for a given sample, if the sample falls on a virtual boundary, then CCSAO is not applied. For the case when the sample does not fall on the virtual boundary, video encoder 200 and video decoder 300 may check all eight neighboring samples (0 to 8) individually for availability, and only the samples which are available (on the same side of the virtual boundary/boundaries as the current sample) are used in computing the band information. Video encoder 200 may select one among the available spatial neighbors for computing the "band" information based on Rate-distortion optimization (RDO) and may signal the selected neighbor in the bitstream.

Additionally, in the "Edge-Based Classifier," the four 1D directions (as shown in FIGS. 8A-8D) are checked for availability. The given 1D direction in which all the samples are available is used for computation of the "band" information.

In another alternative, unavailable samples due to virtual boundary processing are replaced with the padded samples generated from the available neighboring samples, for example by copying the closest available neighboring sample. The replaced samples are used in CCSAO processing, in such way the CCSAO processing may be kept unchanged.

Figure 10:
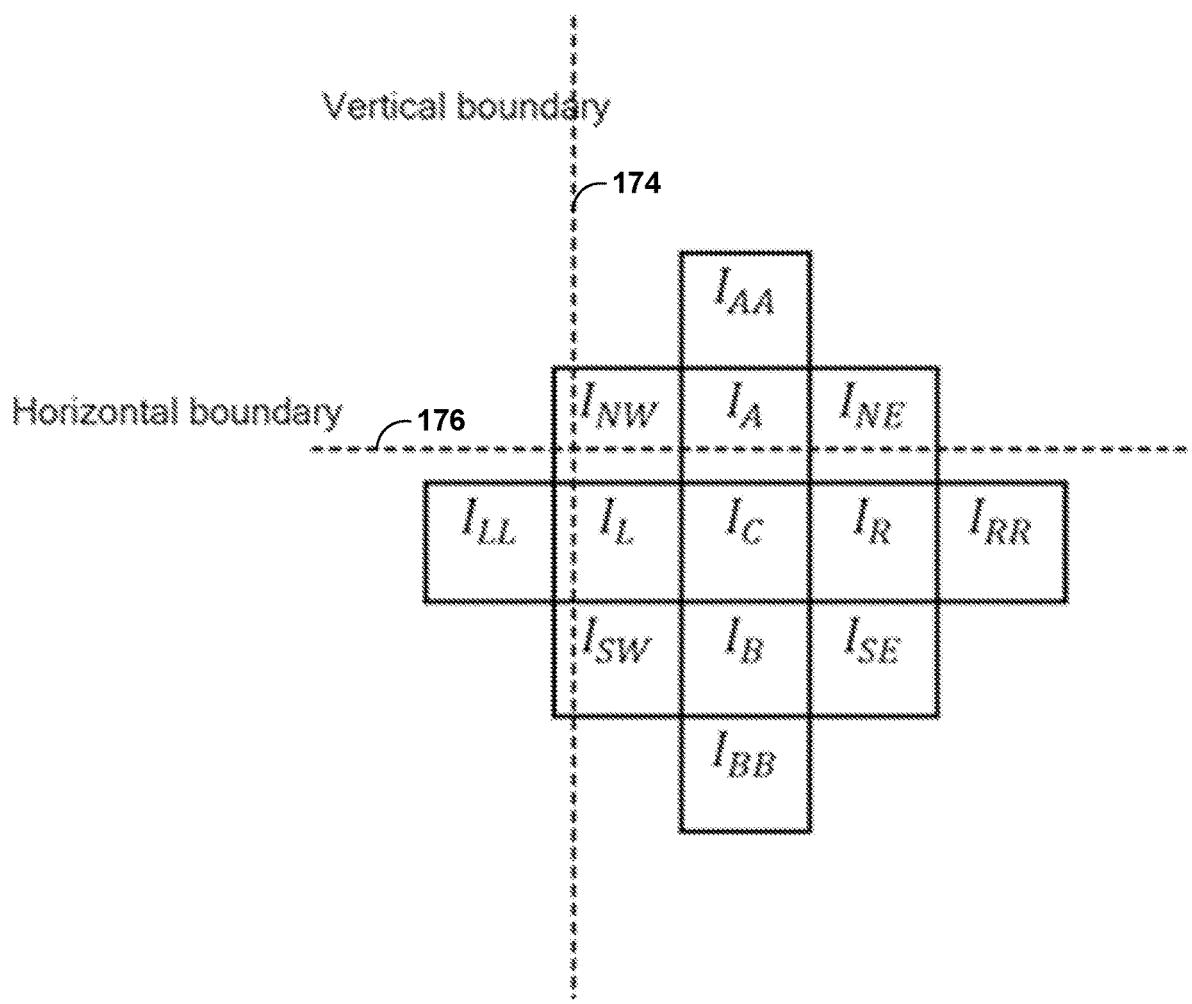
FIG. 10 is a conceptual diagram illustrating an example bilateral filter (BIF) process in the presence of virtual boundaries according to the techniques of this disclosure.

FIG. 10 is a conceptual diagram illustrating an example bilateral filter (BIF) process in the presence of virtual boundaries according to the techniques of this disclosure. Repetitive padding is applied whenever a given sample falls outside of one of the virtual boundaries, i.e., vertical virtual boundary 174 or horizontal virtual boundary 176. For example, in FIG. 10, for filtering of $I_C$, the samples, $I_{NW}$, $I_A$, $I_{NE}$, $I_{AA}$, $I_{NW}$, $I_L$, $I_{SW}$, $I_{LL}$ are considered not available, as they fall along or outside of at least one virtual boundary. Therefore "repetitive" padding is applied by copying the samples, $I_C$, $I_R$, $I_{RR}$, $I_B$, $I_{BB}$ in the respective directions.

For vertical virtual boundary 174, the "repetitive" padding works by copying the samples $I_{AA}$, $I_A$, $I_C$, $I_B$, $I_{BB}$ as a replacement for the samples $I_{NW}$, $I_L$, $I_{SW}$, $I_{LL}$.

For horizontal virtual boundary 176, the "repetitive" padding works by copying the samples $I_L$, $I_C$, $I_R$ $I_{BB}$ as a replacement for the samples $I_{NW}$, $I_A$, $I_{NE}$, $I_{AA}$.

In another alternative, unavailable samples due to virtual boundary processing are excluded from BIF processing.

Virtual boundary processing for ALF in VVC includes application of repetitive padding to the samples which are not available. The minimum padding size required for ALF filtering is 3 samples as the maximum filter size is 7×7 diamond. However, according to the techniques of this disclosure, the maximum filter size is increased to 13×13 diamond, therefore the minimum padding size may be increased to 6 samples. For CCALF, the minimum padding size may be increased to 4 samples.

Figure 11:
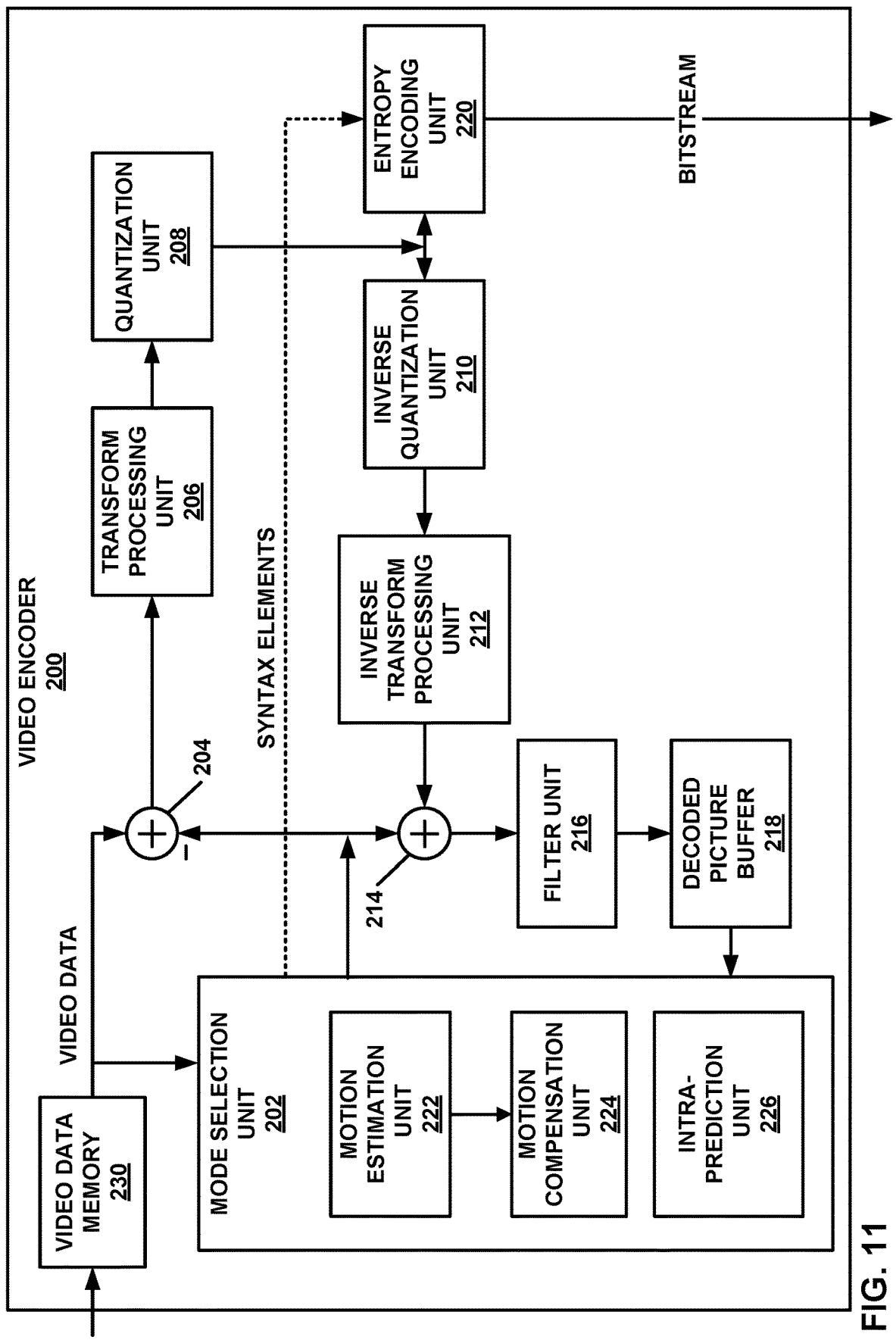
FIG. 11 is a block diagram illustrating an example video encoder that may perform the techniques of this disclosure.

FIG. 11 is a block diagram illustrating an example video encoder 200 that may perform the techniques of this disclosure. FIG. 11 is provided for purposes of explanation and should not be considered limiting of the techniques as broadly exemplified and described in this disclosure. For purposes of explanation, this disclosure describes video encoder 200 according to the techniques of VVC (ITU-T H.266, under development) and HEVC (ITU-T H.265). However, the techniques of this disclosure may be performed by video encoding devices that are configured to other video coding standards and video coding formats, such as AV1 and successors to the AV1 video coding format.

In the example of FIG. 11, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, or FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 11 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, a motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the MTT structure, QTBT structure, superblock structure, or the quadtree structure described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

When operating according to the AV1 video coding format, motion estimation unit 222 and motion compensation unit 224 may be configured to encode coding blocks of video data (e.g., both luma and chroma coding blocks) using translational motion compensation, affine motion compensation, overlapped block motion compensation (OBMC), and/or compound inter-intra prediction.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

When operating according to the AV1 video coding format, intra prediction unit 226 may be configured to encode coding blocks of video data (e.g., both luma and chroma coding blocks) using directional intra prediction, non-directional intra prediction, recursive filter intra prediction, chroma-from-luma (CFL) prediction, intra block copy (IBC), and/or color palette mode. Mode selection unit 202 may include additional functional units to perform video prediction in accordance with other prediction modes.

Mode selection unit 202 provides the prediction block to residual generation unit 204. Residual generation unit 204 receives a raw, uncoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction.

Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as some examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

When operating according to AV1, transform processing unit 206 may apply one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a horizontal/vertical transform combination that may include a discrete cosine transform (DCT), an asymmetric discrete sine transform (ADST), a flipped ADST (e.g., an ADST in reverse order), and an identity transform (IDTX). When using an identity transform, the transform is skipped in one of the vertical or horizontal directions. In some examples, transform processing may be skipped.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples. Filter unit 216 may apply any of the various techniques of this disclosure, alone or in any combination. For example, filter unit 216 may be configured to perform any or all of the CCSAO with virtual boundary techniques, BIF with virtual boundary techniques, and/or ALF with virtual boundary techniques of this disclosure.

Filter unit 216 may be configured to filter a decoded/reconstructed block received from reconstruction unit 214. Filter unit 216 may perform CCSAO according to the techniques of this disclosure, e.g., as discussed above with respect to FIGS. 9 and 10. In particular, filter unit 216 may determine that a current sample of a decoded block neighbors a sample along a virtual boundary in the decoded block. Filter unit 216 may also determine that the current sample neighbors one or more samples that are not along any virtual boundary in the decoded block. In response, filter unit 216 may compute band information to be used for CCSAO for the current sample, using at least one of the one or more samples that are not along any virtual boundary in the decoded block and without using the sample along the virtual boundary.

As explained above with respect to FIG. 9, for example, filter unit 216 may perform CCSAO on sample 2 without using any of samples 1, 4, and 5, but may instead use samples above, above and to the right, and/or to the right of sample 2. As another example, filter unit 216 may perform CCSAO on sample 8 using samples to the right, below and to the right, and/or below sample 8. In some examples, filter unit 216 may replace unavailable neighboring sample values with padding values when performing CCSAO. For example, when performing CCSAO on sample 2, the value of sample 2 may be used as a padding value to replace the values of samples 1 and 5.

When operating according to AV1, filter unit 216 may perform one or more filter operations on reconstructed blocks. For example, filter unit 216 may perform deblocking operations to reduce blockiness artifacts along edges of CUs. In other examples, filter unit 216 may apply a constrained directional enhancement filter (CDEF), which may be applied after deblocking, and may include the application of non-separable, non-linear, low-pass directional filters based on estimated edge directions. Filter unit 216 may also include a loop restoration filter, which is applied after CDEF, and may include a separable symmetric normalized Wiener filter or a dual self-guided filter.

Video encoder 200 stores reconstructed blocks in DPB 218. For instance, in examples where operations of filter unit 216 are not performed, reconstruction unit 214 may store reconstructed blocks to DPB 218. In examples where operations of filter unit 216 are performed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

In accordance with AV1, entropy encoding unit 220 may be configured as a symbol-to-symbol adaptive multi-symbol arithmetic coder. A syntax element in AV1 includes an alphabet of N elements, and a context (e.g., probability model) includes a set of N probabilities. Entropy encoding unit 220 may store the probabilities as n-bit (e.g., 15-bit) cumulative distribution functions (CDFs). Entropy encoding unit 22 may perform recursive scaling, with an update factor based on the alphabet size, to update the contexts.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

In this manner, video encoder 200 represents an example of a device for decoding video data including a memory (e.g., video data memory 230, DPB 218) configured to store video data; and one or more processors (e.g., mode selection unit 202, motion compensation unit 224, intra-prediction unit 226, inverse transform processing unit 212, inverse quantization unit 210, reconstruction unit 214, and filter unit 216) implemented in circuitry and configured to: decode a current block of the video data to form a decoded block; determine that a current sample of the decoded block neighbors a sample along a virtual boundary in the decoded block and neighbors one or more samples that are not along any virtual boundary in the decoded block; compute band information for cross component sample adaptive offset (CCSAO) for the current sample using at least one of the one or more samples that are not along any virtual boundary in the decoded block and without using the sample along the virtual boundary; and perform CCSAO on the current sample using the band information.

Likewise, video encoder 200 represents an example of a device for decoding video data including means (e.g., mode selection unit 202, motion compensation unit 224, intra-prediction unit 226, inverse transform processing unit 212, inverse quantization unit 210, and reconstruction unit 214) for decoding a current block of video data to form a decoded block; means (e.g., filter unit 216) for determining that a sample of the decoded block neighbors a sample along a virtual boundary in the decoded block and neighbors one or more samples that are not along any virtual boundary in the decoded block; means (e.g., filter unit 216) for computing band information for cross component sample adaptive offset (CCSAO) for the sample using at least one of the one or more samples that are not along any virtual boundary in the decoded block and without using the sample along the virtual boundary; and means (e.g., filter unit 216) for performing CCSAO on the sample using the band information.

Figure 12:
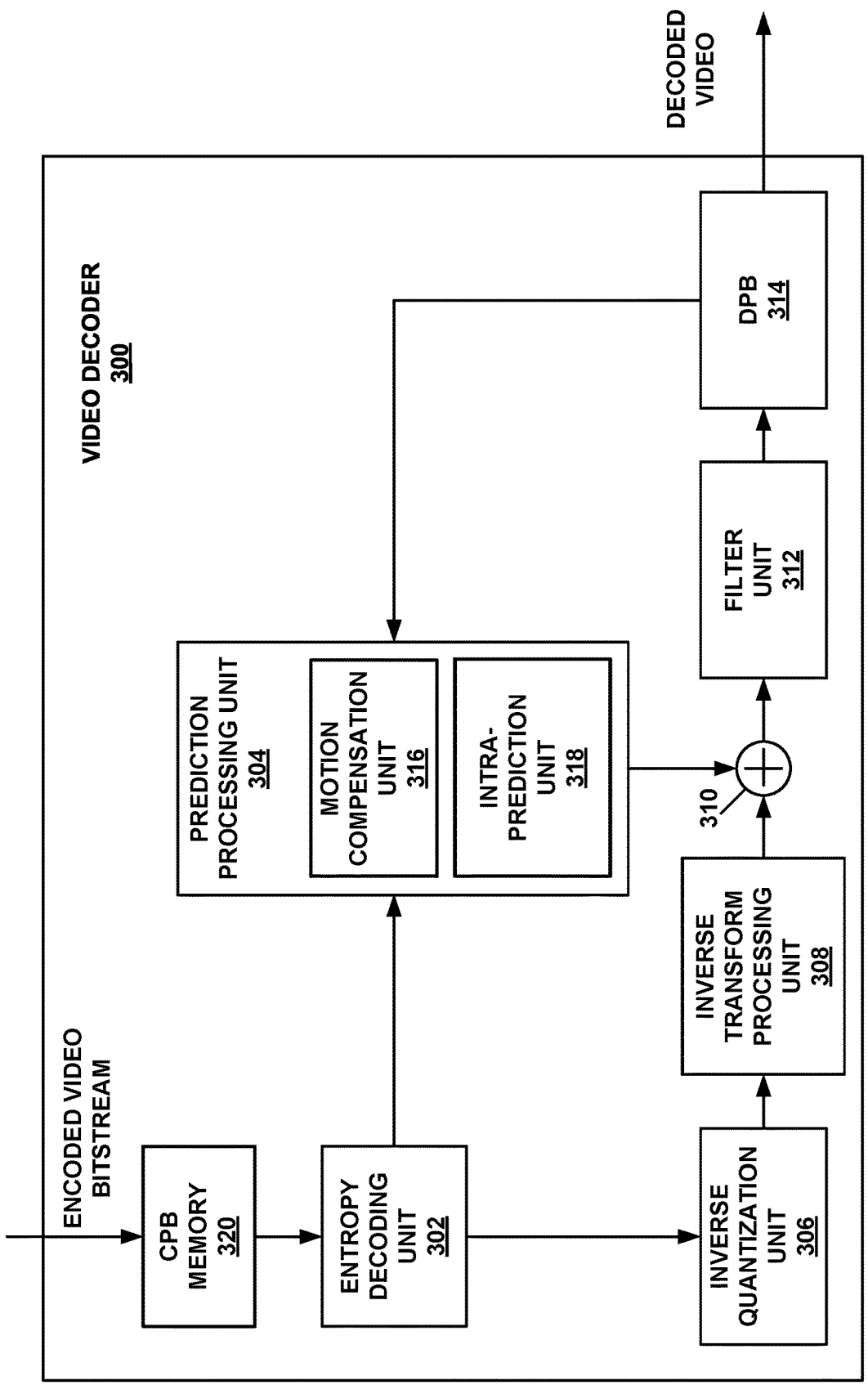
FIG. 12 is a block diagram illustrating an example video decoder that may perform the techniques of this disclosure.

FIG. 12 is a block diagram illustrating an example video decoder 300 that may perform the techniques of this disclosure. FIG. 12 is provided for purposes of explanation and is not limiting on the techniques as broadly exemplified and described in this disclosure. For purposes of explanation, this disclosure describes video decoder 300 according to the techniques of VVC (ITU-T H.266, under development) and HEVC (ITU-T H.265). However, the techniques of this disclosure may be performed by video coding devices that are configured to other video coding standards.

In the example of FIG. 12, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, or FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

When operating according to AV1, motion compensation unit 316 may be configured to decode coding blocks of video data (e.g., both luma and chroma coding blocks) using translational motion compensation, affine motion compensation, OBMC, and/or compound inter-intra prediction, as described above. Intra prediction unit 318 may be configured to decode coding blocks of video data (e.g., both luma and chroma coding blocks) using directional intra prediction, non-directional intra prediction, recursive filter intra prediction, CFL, intra block copy (IBC), and/or color palette mode, as described above.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as dynamic random access memory (DRAM), including synchronous DRAM (SDRAM), magnetoresistive RAM (MRAM), resistive RAM (RRAM), or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 12 are illustrated to assist with understanding the operations performed by video decoder 300. The units may be implemented as fixed-function circuits, programmable circuits, or a combination thereof. Similar to FIG. 11, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

Filter unit 312 may apply any of the various techniques of this disclosure, alone or in any combination. For example, filter unit 312 may be configured to perform any or all of the CCSAO with virtual boundary techniques, BIF with virtual boundary techniques, and/or ALF with virtual boundary techniques of this disclosure.

Filter unit 312 may be configured to filter a decoded/reconstructed block received from reconstruction unit 310. Filter unit 312 may perform CCSAO according to the techniques of this disclosure, e.g., as discussed above with respect to FIGS. 9 and 10. In particular, filter unit 312 may determine that a current sample of a decoded block neighbors a sample along a virtual boundary in the decoded block. Filter unit 312 may also determine that the current sample neighbors one or more samples that are not along any virtual boundary in the decoded block. In response, filter unit 312 may compute band information to be used for CCSAO for the current sample, using at least one of the one or more samples that are not along any virtual boundary in the decoded block and without using the sample along the virtual boundary.

As explained above with respect to FIG. 9, for example, filter unit 312 may perform CCSAO on sample 2 without using any of samples 1, 4, and 5, but may instead use samples above, above and to the right, and/or to the right of sample 2. As another example, filter unit 312 may perform CCSAO on sample 8 using samples to the right, below and to the right, and/or below sample 8. In some examples, filter unit 312 may replace unavailable neighboring sample values with padding values when performing CCSAO. For example, when performing CCSAO on sample 2, the value of sample 2 may be used as a padding value to replace the values of samples 1 and 5.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 11).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 11). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

In this manner, video decoder 300 represents an example of a device for decoding video data including a memory (e.g., CPB 320, DPB 314) configured to store video data; and one or more processors (e.g., prediction processing unit 304, motion compensation unit 316, intra-prediction unit 318, inverse transform processing unit 308, inverse quantization unit 306, reconstruction unit 310, and filter unit 312) implemented in circuitry and configured to: decode a current block of the video data to form a decoded block; determine that a current sample of the decoded block neighbors a sample along a virtual boundary in the decoded block and neighbors one or more samples that are not along any virtual boundary in the decoded block; compute band information for cross component sample adaptive offset (CCSAO) for the current sample using at least one of the one or more samples that are not along any virtual boundary in the decoded block and without using the sample along the virtual boundary; and perform CCSAO on the current sample using the band information.

Likewise, video decoder 300 represents an example of a device for decoding video data including means (e.g., prediction processing unit 304, motion compensation unit 316, intra-prediction unit 318, inverse transform processing unit 308, inverse quantization unit 306, and reconstruction unit 310) for decoding a current block of video data to form a decoded block; means (e.g., filter unit 312) for determining that a sample of the decoded block neighbors a sample along a virtual boundary in the decoded block and neighbors one or more samples that are not along any virtual boundary in the decoded block; means (e.g., filter unit 312) for computing band information for cross component sample adaptive offset (CCSAO) for the sample using at least one of the one or more samples that are not along any virtual boundary in the decoded block and without using the sample along the virtual boundary; and means (e.g., filter unit 312) for performing CCSAO on the sample using the band information.

Figure 13:
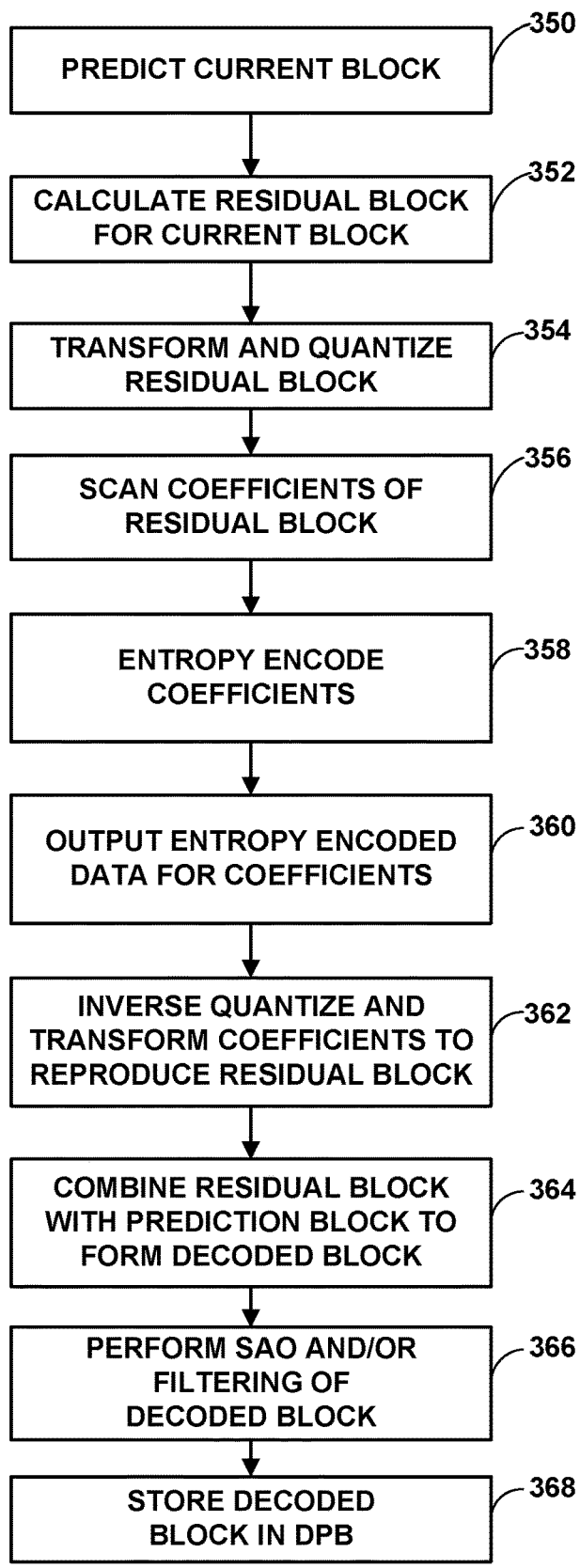
FIG. 13 is a flowchart illustrating an example method for encoding a current block in accordance with the techniques of this disclosure.

FIG. 13 is a flowchart illustrating an example method for encoding a current block in accordance with the techniques of this disclosure. The current block may comprise a current CU. Although described with respect to video encoder 200 (FIGS. 1 and 11), it should be understood that other devices may be configured to perform a method similar to that of FIG. 13.

In this example, video encoder 200 initially predicts the current block (350). For example, video encoder 200 may form a prediction block for the current block. Video encoder 200 may then calculate a residual block for the current block (352). To calculate the residual block, video encoder 200 may calculate a difference between the original, uncoded block and the prediction block for the current block. Video encoder 200 may then transform the residual block and quantize transform coefficients of the residual block (354). Next, video encoder 200 may scan the quantized transform coefficients of the residual block (356). During the scan, or following the scan, video encoder 200 may entropy encode the transform coefficients (358). For example, video encoder 200 may encode the transform coefficients using CAVLC or CABAC. Video encoder 200 may then output the entropy encoded data of the block (360).

Video encoder 200 may also decode the current block after encoding the current block, to use the decoded version of the current block as reference data for subsequently coded data (e.g., in inter- or intra-prediction modes). Thus, video encoder 200 may inverse quantize and inverse transform the coefficients to reproduce the residual block (362). Video encoder 200 may combine the residual block with the prediction block to form a decoded block (364). Video encoder 200 may also perform any of the various techniques of this disclosure related to SAO and/or filtering on the decoded block (366). Video encoder 200 may then store the decoded block in DPB 218 (368).

Figure 14:
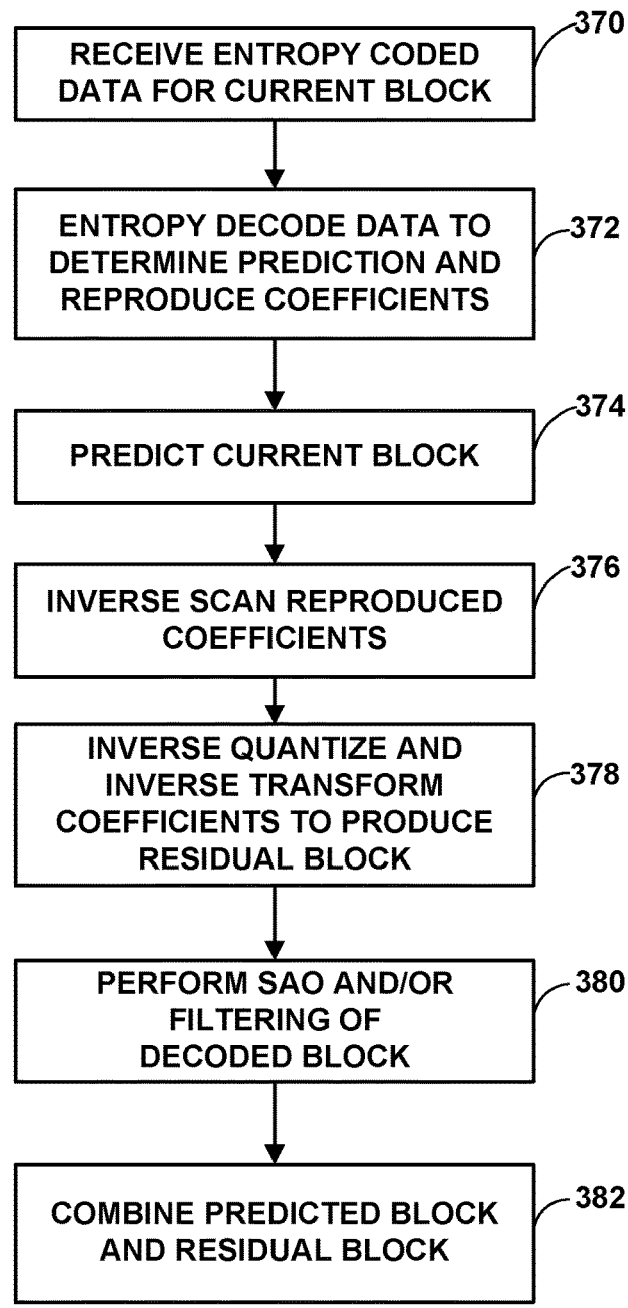
FIG. 14 is a flowchart illustrating an example method for decoding a current block in accordance with the techniques of this disclosure.

FIG. 14 is a flowchart illustrating an example method for decoding a current block of video data in accordance with the techniques of this disclosure. The current block may comprise a current CU. Although described with respect to video decoder 300 (FIGS. 1 and 12), it should be understood that other devices may be configured to perform a method similar to that of FIG. 14.

Video decoder 300 may receive entropy encoded data for the current block, such as entropy encoded prediction information and entropy encoded data for transform coefficients of a residual block corresponding to the current block (370). Video decoder 300 may entropy decode the entropy encoded data to determine prediction information for the current block and to reproduce transform coefficients of the residual block (372). Video decoder 300 may predict the current block (374), e.g., using an intra- or inter-prediction mode as indicated by the prediction information for the current block, to calculate a prediction block for the current block. Video decoder 300 may then inverse scan the reproduced transform coefficients (376), to create a block of quantized transform coefficients. Video decoder 300 may then inverse quantize the transform coefficients and apply an inverse transform to the transform coefficients to produce a residual block (378). Video decoder 300 may also perform any of the various techniques of this disclosure related to SAO and/or filtering on the current block (380). Video decoder 300 may ultimately decode the current block by combining the prediction block and the residual block (382).

Figure 15:
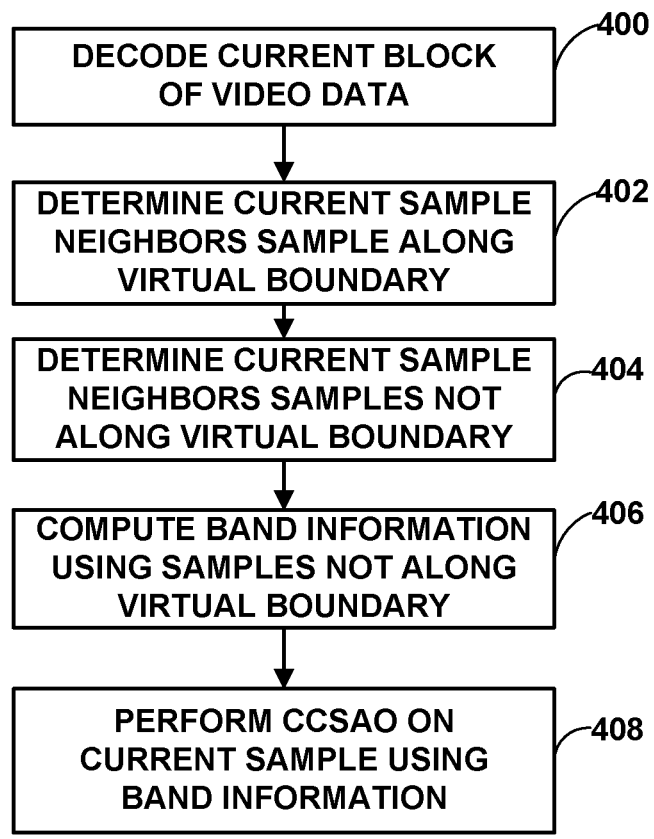
FIG. 15 is a flowchart illustrating an example method of decoding a block of video data and filtering the decoded block of video data according to the techniques of this disclosure.

FIG. 15 is a flowchart illustrating an example method of decoding a block of video data and filtering the decoded block of video data according to the techniques of this disclosure. The method of FIG. 15 may be performed by a video encoding and/or decoding device, such as video encoder 200 or video decoder 300. For purposes of example, the method of FIG. 15 is explained with respect to video decoder 300.

Initially, video decoder 300 decodes a current block of video data (400). For example, video decoder 300 may form a prediction block for the current block, e.g., using inter- and/or intra-prediction. Video decoder 300 may also decode and reconstruct a residual block for the current block. Video decoder 300 may then decode (reconstruct) the current block, e.g., combining samples of the prediction block with co-located samples of the residual block. In some examples, video decoder 300 may also deblocking filter the decoded block.

Video decoder 300 may then determine that a current sample of the decoded current block neighbors a sample along a virtual boundary (402). Virtual boundaries may be signaled using, for example, a sequence parameter set (SPS), a picture parameter set (PPS), an adaptation parameter set (APS), a picture header, a slice header, a block header, or the like. In some cases, virtual boundaries may be derived. In some examples, virtual boundaries may correspond to slice boundaries and/or tile boundaries of a picture. In VVC, for example, an SPS includes syntax elements indicating whether virtual boundaries are enabled, and if so, a number of virtual boundaries, and for each of the virtual boundaries, an x-position of vertical virtual boundaries and a y-position of horizontal virtual boundaries for a sequence of pictures. VVS also includes picture header syntax elements indicating whether virtual boundaries are enabled, and if so, a number of virtual boundaries, and for each of the virtual boundaries, an x-position of vertical virtual boundaries and a y-position of horizontal virtual boundaries for a particular picture.

Thus, video encoder 200 may encode an SPS and/or picture header indicating such information representative of locations of virtual boundaries in a picture or sequence of pictures. Likewise, video decoder 300 may decode the SPS and/or picture header to determine positions of the virtual boundaries, as well as whether samples are along the virtual boundaries. For example, video decoder 300 may determine that a sample is along a virtual boundary when the sample has an x-position equal to one of the x-positions signaled in the SPS or picture header of a vertical virtual boundary or a y-position equal to one of the y-position signaled in the SPS or picture header of a horizontal virtual boundary.

Video decoder 300 may also determine that the current sample of the decoded current block neighbors one or more samples not along any virtual boundary (404). For example, video decoder 300 may determine that the samples have x-positions that are not equal to any of the x-positions of the vertical virtual boundaries signaled in the SPS or picture header and y-positions that are not equal to any of the y-positions of the horizontal virtual boundaries signaled in the SPS or picture header.

Video decoder 300 may then compute band information for the current sample using the one or more samples that are not along any virtual boundary (406). In some examples, video decoder 300 may use a padding value to replace a value of the sample along the virtual boundary when computing the band information. Video decoder 300 may then perform CCSAO on the current sample using the band information (408).

In this manner, the method of FIG. 15 represents an example of a method of decoding video data, including decoding a current block of video data to form a decoded block; determining that a current sample of the decoded block neighbors a sample along a virtual boundary in the decoded block and neighbors one or more samples that are not along any virtual boundary in the decoded block; computing band information for cross component sample adaptive offset (CCSAO) for the current sample using at least one of the one or more samples that are not along any virtual boundary in the decoded block and without using the sample along the virtual boundary; and performing CCSAO on the current sample using the band information.

Various examples of the techniques of this disclosure are summarized in the following clauses:

Clause 1: A method of decoding video data, the method comprising: decoding a current block of video data to form a decoded block; determining that a sample of the decoded block neighbors a sample along a virtual boundary in the decoded block and neighbors one or more samples that are not along any virtual boundary in the decoded block; computing band information for cross component sample adaptive offset (CCSAO) for the sample using at least one of the one or more samples that are not along any virtual boundary in the decoded block and without using the sample along the virtual boundary; and performing CCSAO on the sample using the band information.

Clause 2: The method of clause 1, further comprising disabling CCSAO for the sample along the virtual boundary.

Clause 3: The method of clause 1, wherein the one or more samples that are not along any virtual boundary in the decoded block include a pair of opposite neighboring samples, and wherein computing the band information comprises computing the band information using the pair of opposite neighboring samples.

Clause 4: The method of any of clauses 1 and 2, wherein the one or more samples that are not along any virtual boundary in the decoded block include a pair of opposite neighboring samples, and wherein computing the band information comprises computing the band information using the pair of opposite neighboring samples.

Clause 5: The method of clause 4, wherein the pair of opposite neighboring samples is one of: A) a left-neighboring sample and a right-neighboring sample to the sample, B) an above-neighboring sample and a below-neighboring sample, C) an above-left-neighboring sample and a below-right-neighboring sample, or D) an above-right-neighboring sample and a below-left-neighboring sample.

Clause 6: A method of decoding video data, the method comprising: decoding a block of video data to form a decoded block; determining that a sample of the decoded block neighbors a sample along a virtual boundary of the virtual block and one or more samples that are not along any virtual boundary in the decoded block; replacing the value of the sample along the virtual boundary with a padding value comprising the value of one of the one or more samples that are not along any virtual boundary in the decoded block; and performing bilateral filtering (BIF) on the sample using the padding value.

Clause 7: A method comprising the method of any of clauses 1-4 and the method of clause 5.

Clause 8: The method of any of clauses 5 and 6, further comprising replacing values of samples along or beyond the virtual boundaries in the decoded block and within a filtering region of the sample with padding values determined from the one or more samples that are not along any virtual boundary in the decoded block.

Clause 9: The method of clause 5, further comprising replacing values of samples along or beyond the virtual boundaries in the decoded block and within a filtering region of the sample with padding values determined from the one or more samples that are not along any virtual boundary in the decoded block.

Clause 10: A method of decoding video data, the method comprising: decoding a block of video data to form a decoded block; and performing adaptive loop filtering (ALF) of samples of the decoded block using a minimum padding size of 4 samples.

Clause 11: A method comprising the method of any of clauses 1-9 and the method of clause 10.

Clause 12: The method of any of clauses 1-11, further comprising encoding the current block prior to decoding the current block.

Clause 13: A device for decoding video data, the device comprising one or more means for performing the method of any of clauses 1-12.

Clause 14: The device of clause 13, wherein the one or more means comprise one or more processors implemented in circuitry.

Clause 15: The device of any of clauses 13 and 14, further comprising a display configured to display the decoded video data.

Clause 16: The device of any of clauses 13-15, wherein the device comprises one or more of a camera, a computer, a mobile device, a broadcast receiver device, or a set-top box.

Clause 17: The device of clause 13-16, further comprising a memory configured to store the video data.

Clause 18: A computer-readable storage medium having stored thereon instructions that, when executed, cause a processor of a device for decoding video data to perform the method of any of clauses 1-12.

Clause 19: A device for decoding video data, the device comprising: means for decoding a current block of video data to form a decoded block; means for determining that a sample of the decoded block neighbors a sample along a virtual boundary in the decoded block and neighbors one or more samples that are not along any virtual boundary in the decoded block; means for computing band information for cross component sample adaptive offset (CCSAO) for the sample using at least one of the one or more samples that are not along any virtual boundary in the decoded block and without using the sample along the virtual boundary; and means for performing CCSAO on the sample using the band information.

Clause 20: A device for decoding video data, the device comprising: means for decoding a block of video data to form a decoded block; means for determining that a sample of the decoded block neighbors a sample along a virtual boundary of the virtual block and one or more samples that are not along any virtual boundary in the decoded block; means for replacing the value of the sample along the virtual boundary with a padding value comprising the value of one of the one or more samples that are not along any virtual boundary in the decoded block; and means for performing bilateral filtering (BIF) on the sample using the padding value.

Clause 21: A device for decoding video data, the device comprising: means for decoding a block of video data to form a decoded block; and means for performing adaptive loop filtering (ALF) of samples of the decoded block using a minimum padding size of 4 samples.

Clause 22: A method of decoding video data, the method comprising: decoding a current block of video data to form a decoded block; determining that a current sample of the decoded block neighbors a sample along a virtual boundary in the decoded block and neighbors one or more samples that are not along any virtual boundary in the decoded block; computing band information for cross component sample adaptive offset (CCSAO) for the current sample using at least one of the one or more samples that are not along any virtual boundary in the decoded block and without using the sample along the virtual boundary; and performing CCSAO on the current sample using the band information.

Clause 23: The method of clause 22, further comprising disabling CCSAO for the sample along the virtual boundary.

Clause 24: The method of clause 22, wherein the one or more samples that are not along any virtual boundary in the decoded block include a pair of opposite neighboring samples, and wherein computing the band information comprises computing the band information using the pair of opposite neighboring samples.

Clause 25: The method of clause 24, wherein the pair of opposite neighboring samples is one of: A) a left-neighboring sample and a right-neighboring sample to the current sample, B) an above-neighboring sample and a below-neighboring sample, C) an above-left-neighboring sample and a below-right-neighboring sample, or D) an above-right-neighboring sample and a below-left-neighboring sample.

Clause 26: The method of clause 22, further comprising performing bilateral filtering (BIF) on the current sample using a padding value that replaces the value of the sample along the virtual boundary, the padding value comprising the value of one of the one or more samples that are not along any virtual boundary in the decoded block.

Clause 27: The method of clause 26, further comprising replacing values of samples along or beyond the virtual boundaries in the decoded block and within a filtering region of the sample with padding values determined from the one or more samples that are not along any virtual boundary in the decoded block.

Clause 28: The method of clause 1, further comprising encoding the current block prior to decoding the current block.

Clause 29: A device for decoding video data, the device comprising: a memory configured to store video data; and one or more processors implemented in circuitry and configured to: decode a current block of the video data to form a decoded block; determine that a current sample of the decoded block neighbors a sample along a virtual boundary in the decoded block and neighbors one or more samples that are not along any virtual boundary in the decoded block; compute band information for cross component sample adaptive offset (CCSAO) for the current sample using at least one of the one or more samples that are not along any virtual boundary in the decoded block and without using the sample along the virtual boundary; and perform CCSAO on the current sample using the band information.

Clause 30: The device of clause 29, wherein the one or more processors are further configured to disable CCSAO for the sample along the virtual boundary.

Clause 31: The device of clause 29, wherein the one or more samples that are not along any virtual boundary in the decoded block include a pair of opposite neighboring samples, and wherein to compute the band information, the one or more processors are configured to compute the band information using the pair of opposite neighboring samples.

Clause 32: The device of clause 31, wherein the pair of opposite neighboring samples is one of: A) a left-neighboring sample and a right-neighboring sample to the current sample, B) an above-neighboring sample and a below-neighboring sample, C) an above-left-neighboring sample and a below-right-neighboring sample, or D) an above-right-neighboring sample and a below-left-neighboring sample.

Clause 33: The device of clause 29, wherein the one or more processors are further configured to perform bilateral filtering (BIF) on the current sample using a padding value that replaces the value of the sample along the virtual boundary, the padding value comprising the value of one of the one or more samples that are not along any virtual boundary in the decoded block.

Clause 34: The device of clause 33, wherein the one or more processors are further configured to replace values of samples along or beyond the virtual boundaries in the decoded block and within a filtering region of the sample with padding values determined from the one or more samples that are not along any virtual boundary in the decoded block.

Clause 35: The device of clause 29, wherein the one or more processors are further configured to encode the current block prior to decoding the current block.

Clause 36: The device of clause 29, further comprising a display configured to display the decoded video data.

Clause 37: The device of clause 29, wherein the device comprises one or more of a camera, a computer, a mobile device, a broadcast receiver device, or a set-top box.

Clause 38: A computer-readable storage medium having stored thereon instructions that, when executed, cause a processor to: decode a current block of video data to form a decoded block; determine that a current sample of the decoded block neighbors a sample along a virtual boundary in the decoded block and neighbors one or more samples that are not along any virtual boundary in the decoded block; compute band information for cross component sample adaptive offset (CCSAO) for the current sample using at least one of the one or more samples that are not along any virtual boundary in the decoded block and without using the sample along the virtual boundary; and perform CCSAO on the current sample using the band information.

Clause 39: The computer-readable storage medium of clause 38, further comprising instructions that cause the processor to disable CCSAO for the sample along the virtual boundary.

Clause 40: The computer-readable storage medium of clause 38, wherein the one or more samples that are not along any virtual boundary in the decoded block include a pair of opposite neighboring samples, and wherein the instructions that cause the processor to compute the band information comprise instructions that cause the processor to compute the band information using the pair of opposite neighboring samples.

Clause 41: The computer-readable storage medium of clause 40, wherein the pair of opposite neighboring samples is one of: A) a left-neighboring sample and a right-neighboring sample to the current sample, B) an above-neighboring sample and a below-neighboring sample, C) an above-left-neighboring sample and a below-right-neighboring sample, or D) an above-right-neighboring sample and a below-left-neighboring sample.

Clause 42: The computer-readable storage medium of clause 38, further comprising instructions that cause the processor to perform bilateral filtering (BIF) on the current sample using a padding value that replaces the value of the sample along the virtual boundary, the padding value comprising the value of one of the one or more samples that are not along any virtual boundary in the decoded block.

Clause 43: The computer-readable storage medium of clause 42, further comprising instructions that cause the processor to replace values of samples along or beyond the virtual boundaries in the decoded block and within a filtering region of the sample with padding values determined from the one or more samples that are not along any virtual boundary in the decoded block.

Clause 44: The computer-readable storage medium of clause 38, further comprising instructions that cause the processor to encode the current block prior to decoding the current block.

Clause 45: A device for decoding video data, the device comprising: means for decoding a current block of video data to form a decoded block; means for determining that a sample of the decoded block neighbors a sample along a virtual boundary in the decoded block and neighbors one or more samples that are not along any virtual boundary in the decoded block; means for computing band information for cross component sample adaptive offset (CCSAO) for the sample using at least one of the one or more samples that are not along any virtual boundary in the decoded block and without using the sample along the virtual boundary; and means for performing CCSAO on the sample using the band information.

Clause 46: A method of decoding video data, the method comprising: decoding a current block of video data to form a decoded block; determining that a current sample of the decoded block neighbors a sample along a virtual boundary in the decoded block and neighbors one or more samples that are not along any virtual boundary in the decoded block; computing band information for cross component sample adaptive offset (CCSAO) for the current sample using at least one of the one or more samples that are not along any virtual boundary in the decoded block and without using the sample along the virtual boundary; and performing CCSAO on the current sample using the band information.

Clause 47: The method of clause 46, further comprising disabling CCSAO for the sample along the virtual boundary.

Clause 48: The method of any of clauses 46 and 47, wherein the one or more samples that are not along any virtual boundary in the decoded block include a pair of opposite neighboring samples, and wherein computing the band information comprises computing the band information using the pair of opposite neighboring samples.

Clause 49: The method of clause 48, wherein the pair of opposite neighboring samples is one of: A) a left-neighboring sample and a right-neighboring sample to the current sample, B) an above-neighboring sample and a below-neighboring sample, C) an above-left-neighboring sample and a below-right-neighboring sample, or D) an above-right-neighboring sample and a below-left-neighboring sample.

Clause 50: The method of any of clauses 46-49, further comprising performing bilateral filtering (BIF) on the current sample using a padding value that replaces the value of the sample along the virtual boundary, the padding value comprising the value of one of the one or more samples that are not along any virtual boundary in the decoded block.

Clause 51: The method of clause 50, further comprising replacing values of samples along or beyond the virtual boundaries in the decoded block and within a filtering region of the sample with padding values determined from the one or more samples that are not along any virtual boundary in the decoded block.

Clause 52: The method of any of clauses 46-51, further comprising encoding the current block prior to decoding the current block.

Clause 53: A device for decoding video data, the device comprising: a memory configured to store video data; and one or more processors implemented in circuitry and configured to: decode a current block of the video data to form a decoded block; determine that a current sample of the decoded block neighbors a sample along a virtual boundary in the decoded block and neighbors one or more samples that are not along any virtual boundary in the decoded block; compute band information for cross component sample adaptive offset (CCSAO) for the current sample using at least one of the one or more samples that are not along any virtual boundary in the decoded block and without using the sample along the virtual boundary; and perform CCSAO on the current sample using the band information.

Clause 54: The device of clause 53, wherein the one or more processors are further configured to disable CCSAO for the sample along the virtual boundary.

Clause 55: The device of any of clauses 53 and 54, wherein the one or more samples that are not along any virtual boundary in the decoded block include a pair of opposite neighboring samples, and wherein to compute the band information, the one or more processors are configured to compute the band information using the pair of opposite neighboring samples.

Clause 56: The device of clause 55, wherein the pair of opposite neighboring samples is one of: A) a left-neighboring sample and a right-neighboring sample to the current sample, B) an above-neighboring sample and a below-neighboring sample, C) an above-left-neighboring sample and a below-right-neighboring sample, or D) an above-right-neighboring sample and a below-left-neighboring sample.

Clause 57: The device of any of clauses 53-56, wherein the one or more processors are further configured to perform bilateral filtering (BIF) on the current sample using a padding value that replaces the value of the sample along the virtual boundary, the padding value comprising the value of one of the one or more samples that are not along any virtual boundary in the decoded block.

Clause 58: The device of clause 57, wherein the one or more processors are further configured to replace values of samples along or beyond the virtual boundaries in the decoded block and within a filtering region of the sample with padding values determined from the one or more samples that are not along any virtual boundary in the decoded block.

Clause 59: The device of any of clauses 53-58, wherein the one or more processors are further configured to encode the current block prior to decoding the current block.

Clause 60: The device of any of clauses 53-59, further comprising a display configured to display the decoded video data.

Clause 61: The device of any of clauses 53-60, wherein the device comprises one or more of a camera, a computer, a mobile device, a broadcast receiver device, or a set-top box.

Clause 62: A computer-readable storage medium having stored thereon instructions that, when executed, cause a processor to: decode a current block of video data to form a decoded block; determine that a current sample of the decoded block neighbors a sample along a virtual boundary in the decoded block and neighbors one or more samples that are not along any virtual boundary in the decoded block; compute band information for cross component sample adaptive offset (CCSAO) for the current sample using at least one of the one or more samples that are not along any virtual boundary in the decoded block and without using the sample along the virtual boundary; and perform CCSAO on the current sample using the band information.

Clause 63: The computer-readable storage medium of clause 62, further comprising instructions that cause the processor to disable CCSAO for the sample along the virtual boundary.

Clause 64: The computer-readable storage medium of any of clauses 62 and 63, wherein the one or more samples that are not along any virtual boundary in the decoded block include a pair of opposite neighboring samples, and wherein the instructions that cause the processor to compute the band information comprise instructions that cause the processor to compute the band information using the pair of opposite neighboring samples.

Clause 65: The computer-readable storage medium of clause 64, wherein the pair of opposite neighboring samples is one of: A) a left-neighboring sample and a right-neighboring sample to the current sample, B) an above-neighboring sample and a below-neighboring sample, C) an above-left-neighboring sample and a below-right-neighboring sample, or D) an above-right-neighboring sample and a below-left-neighboring sample.

Clause 66: The computer-readable storage medium of any of clauses 62-65, further comprising instructions that cause the processor to perform bilateral filtering (BIF) on the current sample using a padding value that replaces the value of the sample along the virtual boundary, the padding value comprising the value of one of the one or more samples that are not along any virtual boundary in the decoded block.

Clause 67: The computer-readable storage medium of clause 66, further comprising instructions that cause the processor to replace values of samples along or beyond the virtual boundaries in the decoded block and within a filtering region of the sample with padding values determined from the one or more samples that are not along any virtual boundary in the decoded block.

Clause 68: The computer-readable storage medium of any of clauses 62-67, further comprising instructions that cause the processor to encode the current block prior to decoding the current block.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
    decoding a current block of video data to form a decoded block;
    determining that a current sample of the decoded block neighbors a sample along a virtual boundary in the decoded block and neighbors one or more samples that are not along any virtual boundary in the decoded block;
    selecting a selected sample from the one or more samples that are not along any virtual boundary in the decoded block;
    computing a band classification for cross component sample adaptive offset (CCSAO) for the current sample using the selected sample and without using any other neighboring samples to the current sample; and
    performing CCSAO on the current sample using the band classification.

2. The method of claim 1, further comprising disabling CCSAO for the sample along the virtual boundary.

3. The method of claim 1, further comprising performing bilateral filtering (BIF) on the current sample using a padding value that replaces the value of the sample along the virtual boundary, the padding value comprising the value of one of the one or more samples that are not along any virtual boundary in the decoded block.

4. The method of claim 3, further comprising replacing values of samples along or beyond the virtual boundaries in the decoded block and within a filtering region of the sample with padding values determined from the one or more samples that are not along any virtual boundary in the decoded block.

5. The method of claim 1, further comprising encoding the current block prior to decoding the current block.

6. A device for decoding video data, the device comprising:
    a memory configured to store video data; and
    one or more processors implemented in circuitry and configured to:
        decode a current block of the video data to form a decoded block;
        determine that a current sample of the decoded block neighbors a sample along a virtual boundary in the decoded block and neighbors one or more samples that are not along any virtual boundary in the decoded block;
        select a selected sample from the one or more samples that are not along any virtual boundary in the decoded block;
        compute a band classification for cross component sample adaptive offset (CCSAO) for the current sample using the selected sample and without using any other neighboring samples to the current sample; and
    perform CCSAO on the current sample using the band classification.

7. The device of claim 6, wherein the one or more processors are further configured to disable CCSAO for the sample along the virtual boundary.

8. The device of claim 6, wherein the one or more processors are further configured to perform bilateral filtering (BIF) on the current sample using a padding value that replaces the value of the sample along the virtual boundary, the padding value comprising the value of one of the one or more samples that are not along any virtual boundary in the decoded block.

9. The device of claim 8, wherein the one or more processors are further configured to replace values of samples along or beyond the virtual boundaries in the decoded block and within a filtering region of the sample with padding values determined from the one or more samples that are not along any virtual boundary in the decoded block.

10. The device of claim 6, wherein the one or more processors are further configured to encode the current block prior to decoding the current block.

11. The device of claim 6, further comprising a display configured to display decoded video data including the decoded block.

12. The device of claim 6, wherein the device comprises one or more of a camera, a computer, a mobile device, a broadcast receiver device, or a set-top box.

13. A non-transitory computer-readable storage medium having stored thereon instructions that, when executed, cause a processor to:
    decode a current block of video data to form a decoded block;
    determine that a current sample of the decoded block neighbors a sample along a virtual boundary in the decoded block and neighbors one or more samples that are not along any virtual boundary in the decoded block;

select a selected sample from the one or more samples that are not along any virtual boundary in the decoded block;

compute a band classification for cross component sample adaptive offset (CCSAO) for the current sample using the selected sample and without using any other neighboring samples to the current sample; and perform CCSAO on the current sample using the band classification.

14. The non-transitory computer-readable storage medium of claim 13, further comprising instructions that cause the processor to disable CCSAO for the sample along the virtual boundary.

15. The non-transitory computer-readable storage medium of claim 13, further comprising instructions that cause the processor to perform bilateral filtering (BIF) on the current sample using a padding value that replaces the value of the sample along the virtual boundary, the padding value comprising the value of one of the one or more samples that are not along any virtual boundary in the decoded block.

16. The non-transitory computer-readable storage medium of claim 15, further comprising instructions that cause the processor to replace values of samples along or beyond the virtual boundaries in the decoded block and within a filtering region of the sample with padding values determined from the one or more samples that are not along any virtual boundary in the decoded block.

17. The non-transitory computer-readable storage medium of claim 13, further comprising instructions that cause the processor to encode the current block prior to decoding the current block.

18. A device for decoding video data, the device comprising:

means for decoding a current block of video data to form a decoded block;

means for determining that a sample of the decoded block neighbors a sample along a virtual boundary in the decoded block and neighbors one or more samples that are not along any virtual boundary in the decoded block;

means for selecting a selected sample from the one or more samples that are not along any virtual boundary in the decoded block;

means for computing a band classification for cross component sample adaptive offset (CCSAO) for the sample using the selected sample and without using any other neighboring samples to the current sample; and means for performing CCSAO on the sample using the band classification.

19. The method of claim 1, wherein determining that the current sample of the decoded block neighbors the sample along the virtual boundary in the decoded block and neighbors the one or more samples that are not along any virtual boundary in the decoded block comprises processing each neighboring sample of the current sample of the decoded block to determine that the current sample of the decoded block neighbors the sample along the virtual boundary in the decoded block and neighbors the one or more samples that are not along any virtual boundary in the decoded block.

20. The method of claim 1, wherein the virtual boundary comprises one of a vertical virtual boundary defined by a constant horizontal coordinate value "X" or a horizontal virtual boundary defined by a constant vertical coordinate value "Y".

21. The device of claim 6, wherein to determine that the current sample of the decoded block neighbors the sample along the virtual boundary in the decoded block and neighbors the one or more samples that are not along any virtual boundary in the decoded block, the processing system is configured to process each neighboring sample of the current sample of the decoded block to determine that the current sample of the decoded block neighbors the sample along the virtual boundary in the decoded block and neighbors the one or more samples that are not along any virtual boundary in the decoded block.

22. The device of claim 6, wherein the virtual boundary comprises one of a vertical virtual boundary defined by a constant horizontal coordinate value "X" or a horizontal virtual boundary defined by a constant vertical coordinate value "Y".

23. The non-transitory computer-readable storage medium of claim 13, wherein the instructions that cause the processor to determine that the current sample of the decoded block neighbors the sample along the virtual boundary in the decoded block and neighbors the one or more samples that are not along any virtual boundary in the decoded block comprise instructions that cause the processor to process each neighboring sample of the current sample of the decoded block to determine that the current sample of the decoded block neighbors the sample along the virtual boundary in the decoded block and neighbors the one or more samples that are not along any virtual boundary in the decoded block, and wherein the virtual boundary comprises one of a vertical virtual boundary defined by a constant horizontal coordinate value "X" or a horizontal virtual boundary defined by a constant vertical coordinate value "Y".

24. The device of claim 18, wherein the means for determining that the current sample of the decoded block neighbors the sample along the virtual boundary in the decoded block and neighbors the one or more samples that are not along any virtual boundary in the decoded block comprises means for processing each neighboring sample of the current sample of the decoded block to determine that the current sample of the decoded block neighbors the sample along the virtual boundary in the decoded block and neighbors the one or more samples that are not along any virtual boundary in the decoded block, and wherein the virtual boundary comprises one of a vertical virtual boundary defined by a constant horizontal coordinate value "X" or a horizontal virtual boundary defined by a constant vertical coordinate value "Y".

* * * * *